United States Patent
Tahata

(10) Patent No.: US 8,036,006 B2
(45) Date of Patent: Oct. 11, 2011

(54) POWER SUPPLY CIRCUIT HAVING RESISTANCE ELEMENT CHANGING ITS RESISTANCE VALUE TO LIMIT CURRENT FLOWING TO CAPACITIVE LOAD

(75) Inventor: Takashi Tahata, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 294 days.

(21) Appl. No.: 12/314,687

(22) Filed: Dec. 15, 2008

(65) Prior Publication Data
US 2009/0189588 A1 Jul. 30, 2009

(30) Foreign Application Priority Data

Jan. 28, 2008 (JP) .................. 2008-016832

(51) Int. Cl.
*H02M 7/122* (2006.01)
*G05F 1/573* (2006.01)

(52) U.S. Cl. ............. 363/56.1; 363/56.07; 323/277
(58) Field of Classification Search ............ 363/50, 363/52, 53, 56.07, 56.1; 323/276, 277
See application file for complete search history.

(56) References Cited

U.S. PATENT DOCUMENTS

| 5,574,632 | A  | * | 11/1996 | Pansier | 363/49 |
|---|---|---|---|---|---|
| 6,573,693 | B2 |   | 6/2003 | Okamoto | |
| 6,646,842 | B2 | * | 11/2003 | Pan et al. | 361/58 |
| 6,735,064 | B2 | * | 5/2004 | Miyazaki | 361/58 |
| 2002/0033727 | A1 |   | 3/2002 | Okamoto | |
| 2003/0035311 | A1 | * | 2/2003 | Phadke | 363/89 |
| 2007/0014134 | A1 | * | 1/2007 | Shih | 363/52 |
| 2007/0252565 | A1 | * | 11/2007 | Wang et al. | 323/277 |
| 2008/0068871 | A1 | * | 3/2008 | Kokubun et al. | 363/80 |

FOREIGN PATENT DOCUMENTS

JP 2002-91584 3/2002
JP 2002-116828 4/2002

* cited by examiner

*Primary Examiner* — Adolf Berhane
*Assistant Examiner* — Jeffrey Gblende
(74) *Attorney, Agent, or Firm* — McGinn IP Law Group, PLLC

(57) ABSTRACT

A power supply circuit includes a control circuit which outputs a control signal when an in-rush current flows and a power-supply-resistance control circuit which supplies a current to a capacitive load. The power-supply-resistance control circuit, provided in the current path between a power supply and the capacitive load, increases the resistance of the current path in response to the control signal and reduces the resistance of the current path in response to a stop page of the control signal, whereby the control signal is output or stopped so that the in-rush current is suppressed to a value smaller than or equal to a given value.

3 Claims, 27 Drawing Sheets

GATE-SOURCE VOLTAGE OF INRUSH CURRENT CONTROL TRANSISTOR

DRAIN-SOURCE VOLTAGE OF INRUSH CURRENT CONTROL TRANSISTOR

INPUT CURRENT OF DC/DC CONVERTER

Figure 18A INPUT VOLTAGE(vin)

Figure 18B CURRENT CIRCUIT POWER-ON SEQUENCE SIGNAL(Spw)

Figure 18C INTERNALLY-GENERATED-VOLTAGE DETECTING SIGNAL (IIV)

Figure 18D INRUSH CURRENT LIMITING SIGNAL(C0)

Figure 18E POWER SUPPLY CURRENT (Ivin)

Figure 18F 1x OUTPUT VOLTAGE (Vdcin)

Figure 18G 2x OUTPUT VOLTAGE (Vout)

POWER SUPPLY CIRCUIT HAVING RESISTANCE ELEMENT CHANGING ITS RESISTANCE VALUE TO LIMIT CURRENT FLOWING TO CAPACITIVE LOAD

BACKGROUND OF THE INVENTION

1. Field of the Invention

The present invention relates to a power supply circuit and, in particular, to a power supply circuit applicable to a driving circuit of a display device.

2. Description of Related Art

There is a growing demand for larger screens and higher resolutions of display devices built into mobile apparatuses such as mobile phones and PDAs. As the screens of a display device become larger, the data lines on the display panels become longer. Accordingly, the parasitic capacitances of the data lines on the display panels increases. As the resolutions of display devices become higher, the number of pixel control switches connected to the data lines on the display panels increases. With the increase in resolution of the display devices, the number of data lines increases. Accordingly, the total value of parasitic capacitances of display panels increases.

To properly drive a display panel having parasitic capacitances, a driving circuit having a high output-current-supply capacity is required. MOS transistors are generally used as driving circuits for display devices. In such a driving circuit, an increase of the output-current-supply capacity means an increase in the parasitic capacitance of the whole driving circuit connected to a power supply line.

When a load with a large capacitance is driven, an in-rush current can flow in the load at power-on. The larger the capacitance viewed from the power supply and the smaller the resistance in the path to the capacitance, the greater the in-rush current is. When an in-rush current flows, a counter-electromotive voltage expressed by the following Equation (1) can be generated:

$$E = -L \cdot di/dt \quad (1)$$

Here, E represents the counter-electromotive voltage (V), L represents the value of inductance (H) viewed from the power supply, and i represents the power supply current (A). As can be seen from Equation (1), the counter-electromotive voltage is a generated voltage opposite in polarity to the power supply. Accordingly, a large value of the counter-electromotive voltage can cause a failure in the power supply itself or a device that is a load of the power supply.

Furthermore, an in-rush current can reduce the life of the wiring. Typically, an in-rush current has a current value several- to several-tens-fold greater than a normal operating current. Therefore, in the case of a device that is frequently turned on, the in-rush current value is more likely to affect the wiring life of the power supply line. In a device such as a display device for a mobile apparatus in which the power supply line is provided on a semiconductor device, the wiring film thickness of the power wiring is thin. Therefore, the influence of in-rush current values in the display devices built in mobile apparatuses on the wiring life has been a great concern.

In general, mobile apparatuses use a battery (rechargeable battery) as the main power supply of their systems. The battery supplies a constant voltage. Therefore, a semiconductor integrated circuit including a driving circuit for a display device for a mobile apparatus has a step-up power supply circuit in its semiconductor device for internally generating multiple voltages required for the display device. The step-up power supply circuit is a circuit that generates a boosted power supply higher than the voltage of a main power supply or a step-down power supply generating a negative voltage (hereinafter step-down is also referred to as "step-up" because step-down is a kind of step-up). An example is a charge-pump step-up power-supply circuit that changes the connection of a step-up capacitor charged with an input voltage to a series connection with the input voltage to accomplish voltage step-up by time-division driving.

The charge-pump step-up power-supply circuit requires charging the step-up capacitor in a short time in order to create a voltage source required for time-division driving in which recharge and discharge are repeated. Therefore, the step-up capacitor is connected to an input power supply by using a low resistance. In order to provide a current value of an entire driving circuit that operates at the voltage by time-division driving with a voltage drop in a specified range, the step-up capacitor needs to have a sufficiently large capacitance with respect to the current value in normal operation of the load. That is, the charge-pump step-up circuit is a large capacitance connected using a low resistance when viewed from the power supply, and can increase an in-rush current at power-on.

Furthermore, low power consumption is essential for mobile display devices in order to increase battery life and therefore the display device is frequently turned on and off. This increases the frequency of occurrence of in-rush current. Techniques for suppressing in-rush currents are known (for example, see Patent Documents 1 and 2).

FIG. 1 is a block diagram showing a technique described in Patent Document 1 (Japanese Patent Application Laid-Open No. 2002-116828). As shown in FIG. 1, in a circuit described in Patent Document 1, an in-rush current suppressing transistor 111 is connected in series with a power-supply path. The in-rush current suppressing transistor 111 controls a power supply current. The circuit described in Patent Document 1 is configured so that its resistance reaches the maximum at power-on and becomes minimum when it is determined that the in-rush current has disappeared. FIG. 2 shows waveform charts illustrating operation of the circuit described in Patent Document 1. FIG. 2A shows the gate-source voltage of the in-rush current suppressing transistor 111. FIG. 2B shows the drain-source voltage of the in-rush current suppressing transistor 111. FIG. 2C shows an input current of a DC/DC converter.

As shown in FIG. 2A, the rate of increase of a power supply current at power-on is reduced to a very small value and the power supply current is gradually increased and, at the time point when it is determined that the in-rush current has disappeared, that is, the voltage supplied to the load approaches a specified value, the power supply current value is rapidly reduced back to a normal current value in the circuit in Patent Document 1. The circuit described in Patent Document 1 operates as shown in the waveform to minimize the initial counter-electromotive voltage.

FIG. 3 shows waveform charts illustrating operation described in Patent Document 2 (Japanese Patent Application Laid-Open No. 2002-091584). As shown in FIG. 3, a technique described in Patent Document 2 constantly increases a power supply current Iout from the value at power-on and, when an output voltage approaches a specified value, the power supply current is rapidly reduced back to a normal power supply current value. The circuit operates as shown in the waveform to suppress the counter-electromotive voltage to a fixed value.

SUMMARY

Designing the power-supply wiring life of a semiconductor device with a conventional technique so that an in-rush current associated with frequent power-on is tolerated means increasing the line width of the power supply wiring. The wide power-supply wiring can increase the chip layout area of the semiconductor device and increase the cost of the chip.

For example, in the circuit in Patent Document 1, the power supply current starts increasing at time t1 and is constantly increased until time t2 at which a specified output voltage is reached. In an apparatus that is frequently powered on, the life of the power-supply wiring in the whole apparatus through which a power supply current passes must be designed by taking into account the peak current value at time t2. To achieve this especially in a semiconductor device, a large line width of the wiring must be chosen, which has posed the problem that chip area and costs increase.

In the technique in Patent Document 2, the power supply current is increased at a constant rate. Accordingly, at the end of soft power-up, that is, at the time point when it is determined that the power supply voltage has reached a specified value and no in-rush current is present, the maximum power-supply current flows. The technique in Patent Document 2 also requires design of power-supply wiring that takes into account the maximum power-supply current. Therefore, in order to implement this in a semiconductor device, a large line width of the wiring must be chosen, which has posed the problem that chip area and costs increase.

Furthermore, the circuit in Patent Document 1 shown in FIG. 1 has a configuration that absolutely requires reference diodes 116 and 114. It also requires a capacitor 118. Mounting these components on a semiconductor device requires an increased area and increases cost. For example, it is reasonable to provide the capacitor 118 as a separate component external to the semiconductor device. However, the external capacitor adds component cost, parts inventory cost, substrate cost and the cost for mounting to the substrate, increasing the costs of the entire apparatus. That is, both of these circuits have the problem that they add the costs of the apparatus including the semiconductor device.

Moreover, the power supply needs to be powered up to a specified voltage in a short time because power-on is frequently performed. However, conventional circuits with given maximum allowable in-rush currents have a problem that the power-supply power-up time cannot be reduced.

There is a demand for a power supply circuit for a display device driving circuit that is capable of suppressing the maximum value of an in-rush current to a value smaller than or equal to a given design value while keeping an increase of chip costs at a minimum.

A power supply circuit is configured that includes a control circuit outputting a control signal when an in-rush current flows and a power-supply-resistance control circuit supplying a current to a capacitive load. The power-supply-resistance control circuit, provided in the current path between a power supply and the capacitive load, increases the resistance of the current path in response to the control signal and reduces the resistance of the current path in response to a stop of the control signal, whereby the control signal is output or stopped so that the in-rush current is suppressed to a value smaller than or equal to a given value.

The power supply circuit supplies power through the power supply path whose resistance is greater when an in-rush current flows and is otherwise smaller. This suppresses the maximum current that passes through the capacitive load to a level lower than or equal to a design value.

According to the present invention, a power supply circuit can be configured that is capable of suppressing an in-rush current that occurs at turn-on of a power supply circuit to a value smaller than or equal to a given in-rush current value and powering up a power supply in a shorter time.

With this, a driving circuit of a display device can be implemented that is capable of suppressing the maximum value of an in-rush current to a value smaller than or equal to a given design value while keeping an increase of chip costs at a minimum, and a semiconductor device for the driving circuit of the display device can be configured without adding an external component to increase the size and weight of a mobile terminal which is competing in size by the millimeter and in weight by the gram.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 4:
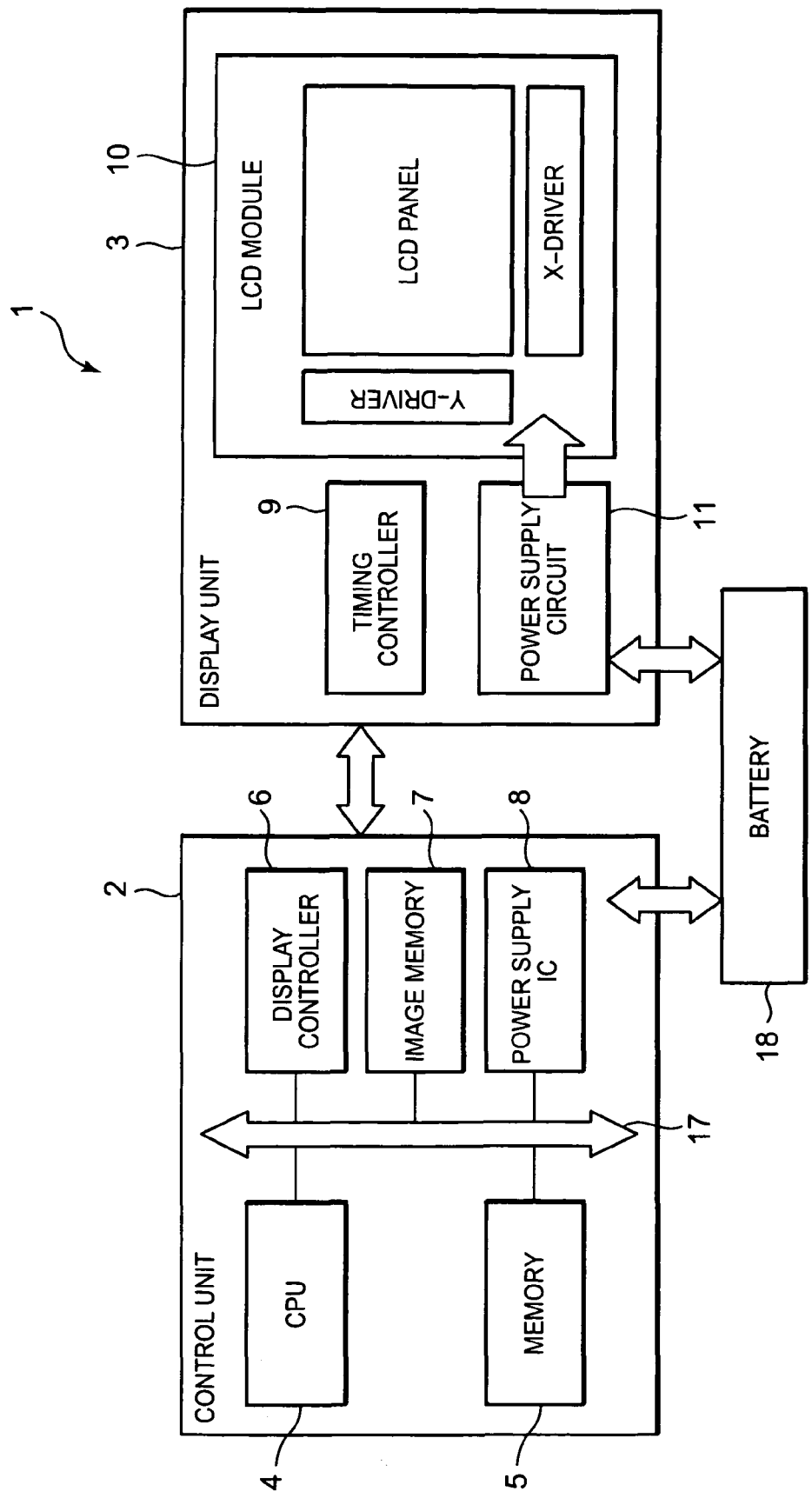
FIG. 4 is a block diagram illustrating a configuration of an apparatus to which a power supply circuit of the present exemplary embodiment can be applied.

FIG. 4 is a block diagram illustrating a configuration of an apparatus to which a power supply circuit 11 of the exemplary embodiment can be applied. In the exemplary embodiment described below, an example will be described in which the power supply circuit 11 is applied to a mobile phone 1. The following description is not intended to limit apparatuses to which the power supply circuit 11 is applicable to mobile phones 1.

Figure 1:
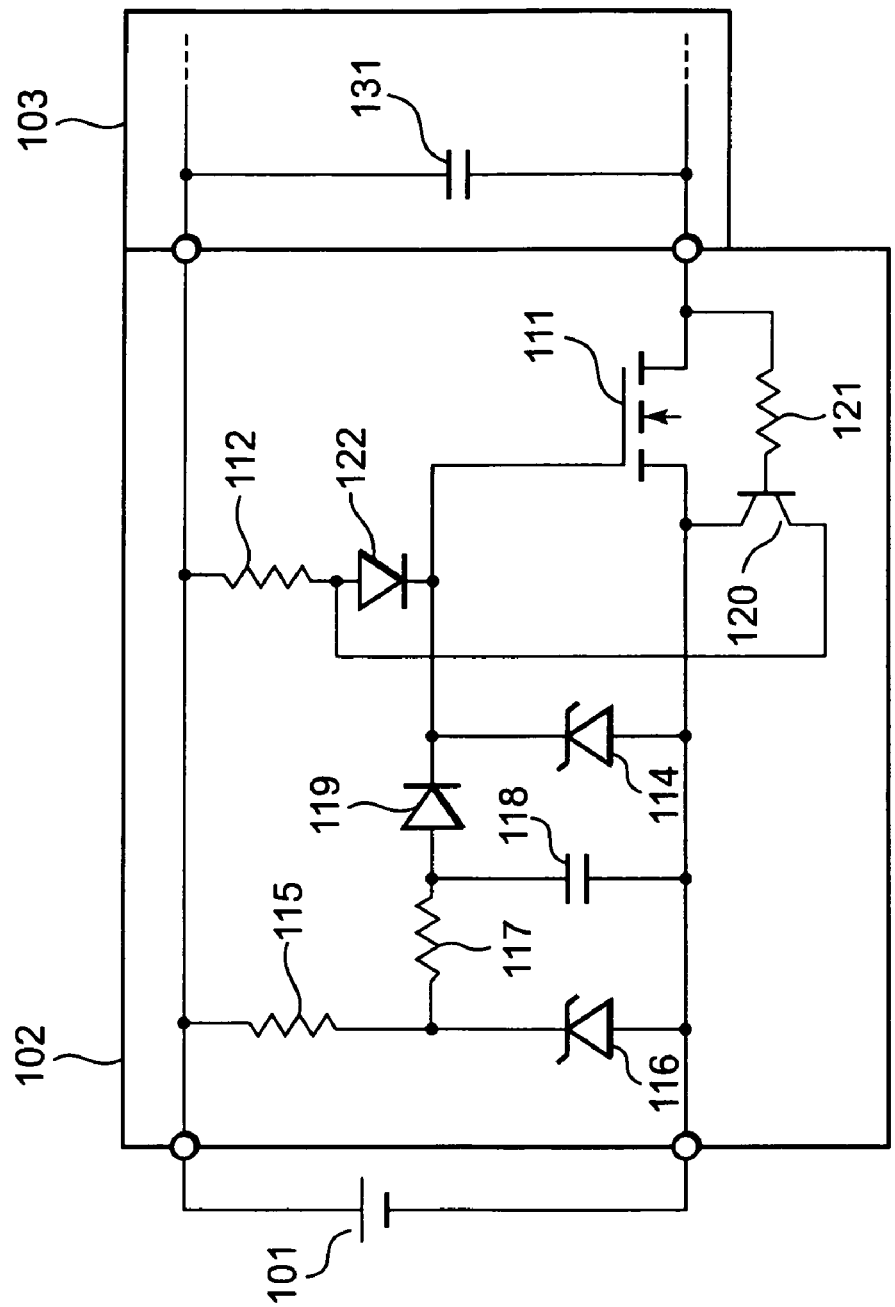
FIG. 1 is a block diagram showing an in-rush current suppressing circuit technique of a related art.
Figure 2A:
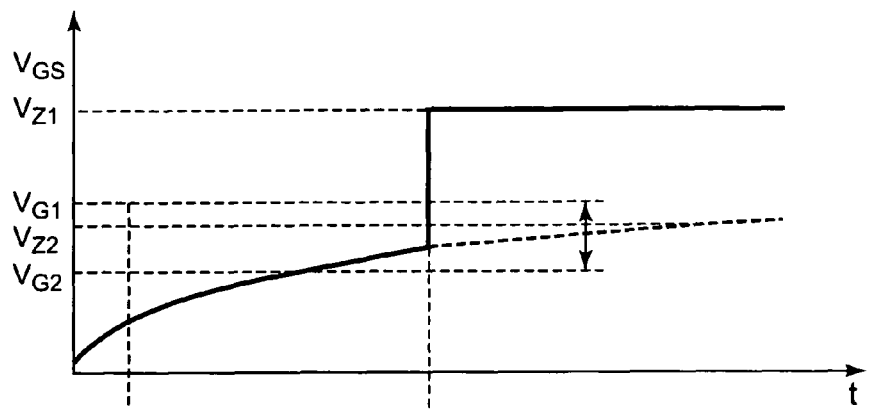
FIG. 2 shows waveform charts illustrating operation of an in-rush current suppressing circuit of a related art.
Figure 2B:
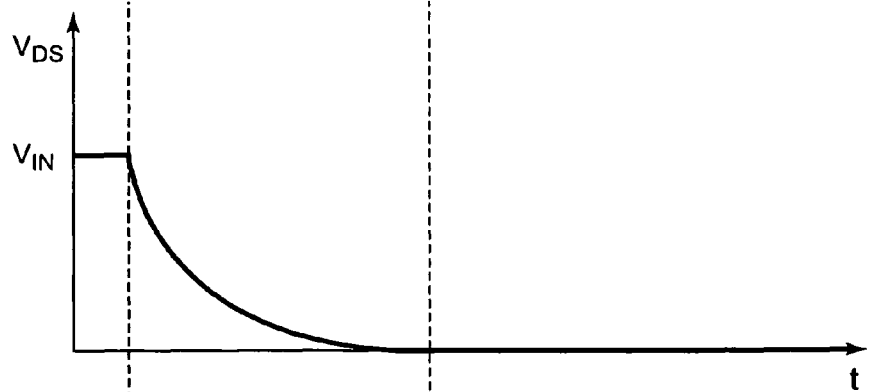
Figure 2C:
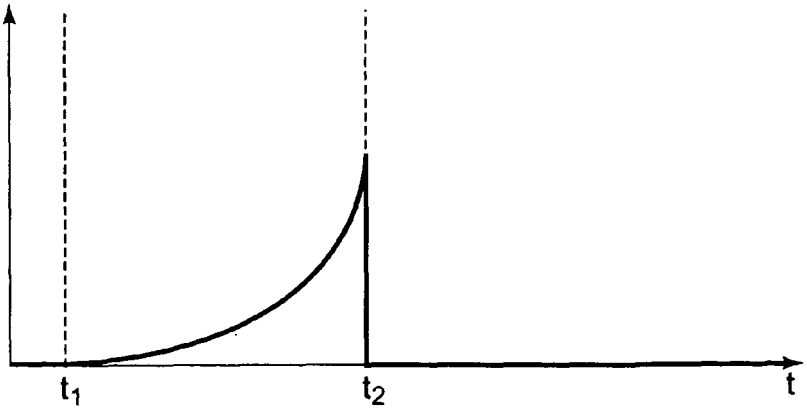
Figure 3:
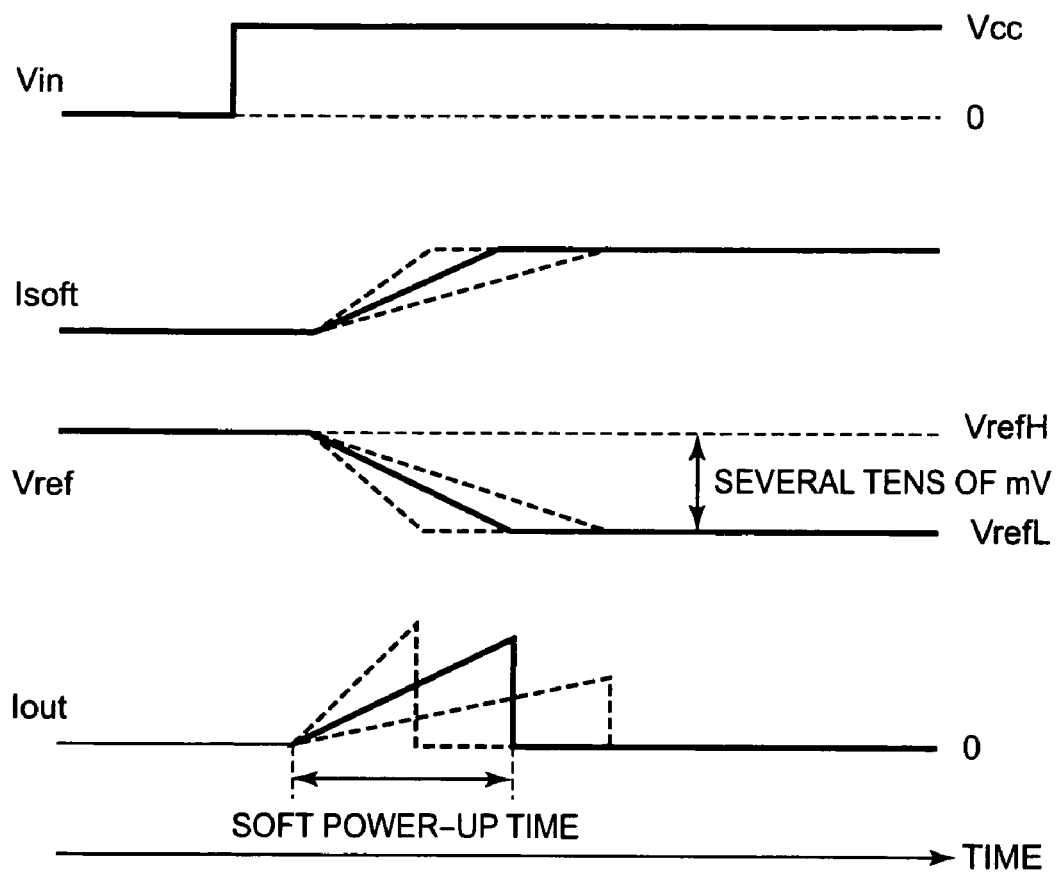
FIG. 3 shows waveform charts illustrating operation of an electric apparatus of a related art.

Referring to FIG. 1, the mobile phone 1 includes a control unit 2 and a display unit 3. Each of the control unit 2 and the display unit 3 is supplied with power from a battery 18. The control unit 2 and the display unit 3 are configured so that they can communicate data with each other.

The control unit 2 includes a CPU 4, a memory 5, a display controller 6, an image memory 7, and a power supply IC 8, which are interconnected through a bus 17.

The CPU 4 controls various devices provided in the mobile phone 1 and performs data processing. The CPU 4 interprets data received from a device such as an input device (not shown) to perform computation and outputs the result on a device such as an output device (for example the display unit 3). The memory 5 stores data to be used by the CPU 4 during processing. The display controller 6 converts image data held in the image memory 7 to display data and provides the display data to the display unit 3. The image memory 7 holds image data to be displayed on the display unit 3. The power supply IC 8 supplies power required for functional blocks of the control unit 2.

The display unit 3 includes a timing controller 9, an LCD module 10, and a power supply circuit 11. The timing controller 9 receives display data provided from the display controller 6 and provides the data to the LCD module 10. The LCD module 10 displays an image based on the display data. The power supply circuit 11 generates multiple voltages and provide them to the LCD module 10.

Figure 5:
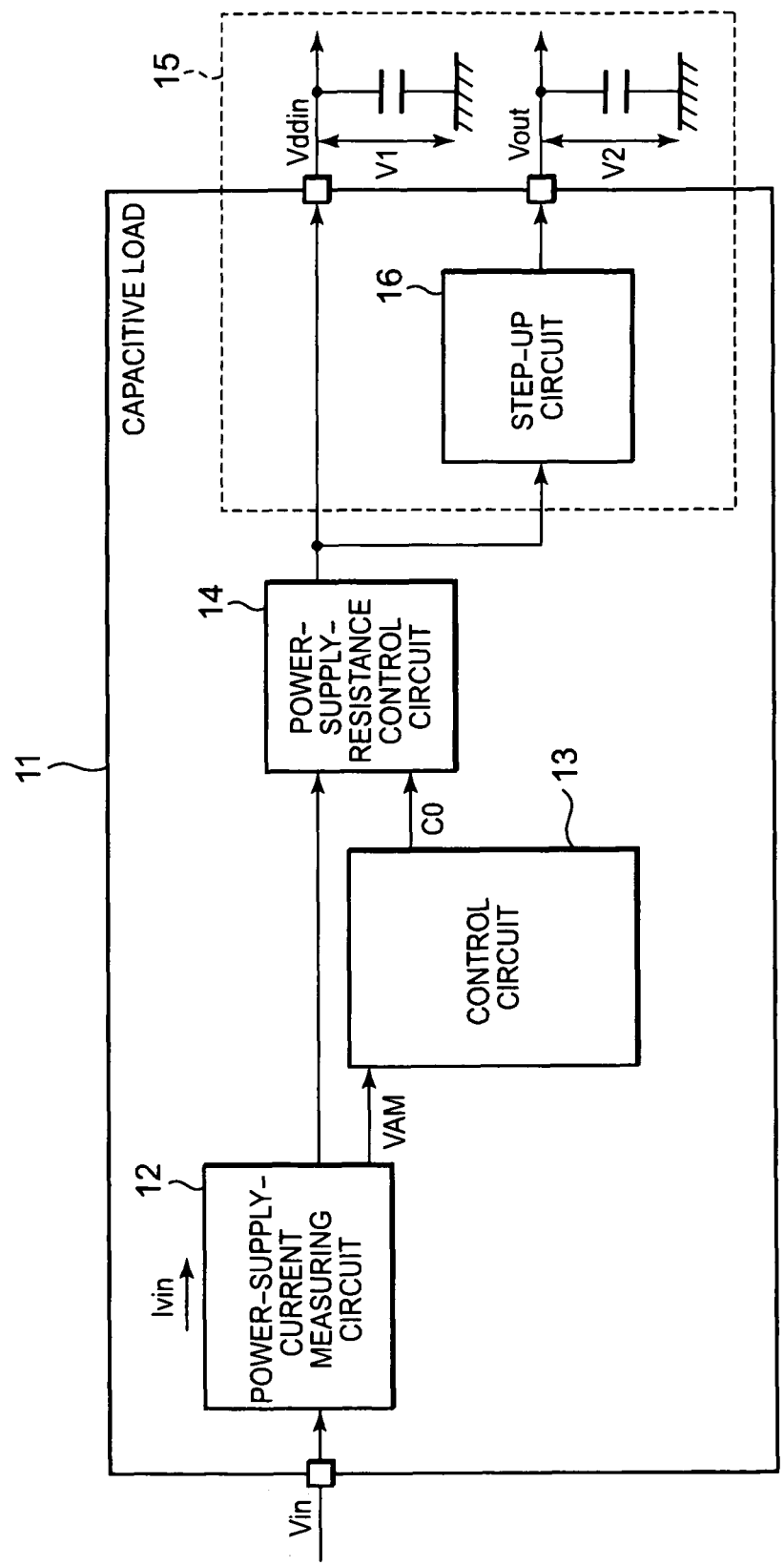
FIG. 5 is a block diagram illustrating a configuration of a power supply circuit 11 of a first exemplary embodiment.

FIG. 5 is a block diagram illustrating a configuration of the power supply circuit 11 of the first exemplary embodiment. The power supply circuit 11 includes a power-supply-current measuring circuit 12, a control circuit 13, and a power-supply-resistance control circuit 14. As shown in FIG. 5, a capacitance connected to a first terminal Vddin, a signal line connected to a second terminal Vout, and a step-up circuit 16 constitute a capacitive load 15. The second terminal Vout receives a voltage output from the step-up circuit 16. The configuration of the capacitive load 15 in the exemplary embodiment is presented for facilitating understanding of the present invention and is not intended to limit the capacitive load 15 to the capacitance connected to the first terminal Vddin and the capacitance connected to the second terminal Vout.

The power-supply-current measuring circuit 12 supplies an input power supply voltage Vin from an external source to the power-supply-resistance control circuit 14. The power-supply-current measuring circuit 12 generates a signal voltage VAM according to the magnitude of a power supply current Ivin and outputs the signal voltage VAM to the control circuit 13. The control circuit 13 receives the signal voltage VAM from the power-supply-current measuring circuit 12 and outputs a control signal CO to the power-supply-resistance control circuit 14. The power-supply-resistance control circuit 14 receives the power supply input from the power-supply-current measuring circuit 12 and the control signal CO from the control circuit 13 and controls a power-supply resistance to supply power to the capacitive load.

Figure 6:
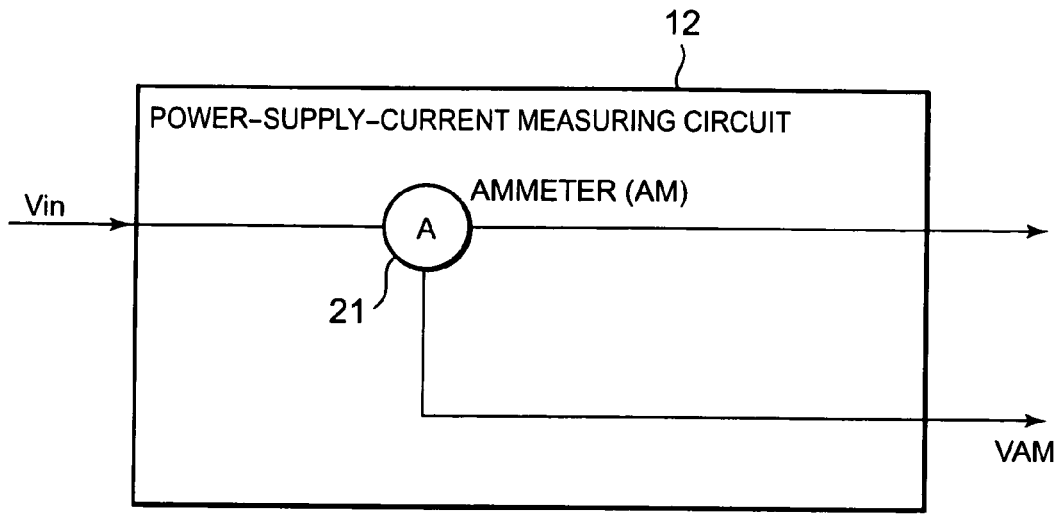
FIG. 6 is a block diagram illustrating a specific configuration of a power-supply-current measuring circuit 12 of the first exemplary embodiment.

FIG. 6 is a block diagram illustrating a specific configuration of the power-supply-current measuring circuit 12. As shown in FIG. 6, the power-supply-current measuring circuit 12 includes an ammeter 21. The power-supply-current measuring circuit 12 outputs the input power supply voltage Vin to the subsequent stage. The ammeter 21, which is connected in series with the power-supply wiring path of the power-supply-current measuring circuit 12, outputs a signal voltage VAM according to a current value. The configuration of the ammeter 21 in the exemplary embodiment is not limited to a specific one. Therefore, description of a specific circuit configuration of the ammeter 21 will be omitted in the following description of exemplary embodiments.

Figure 7:
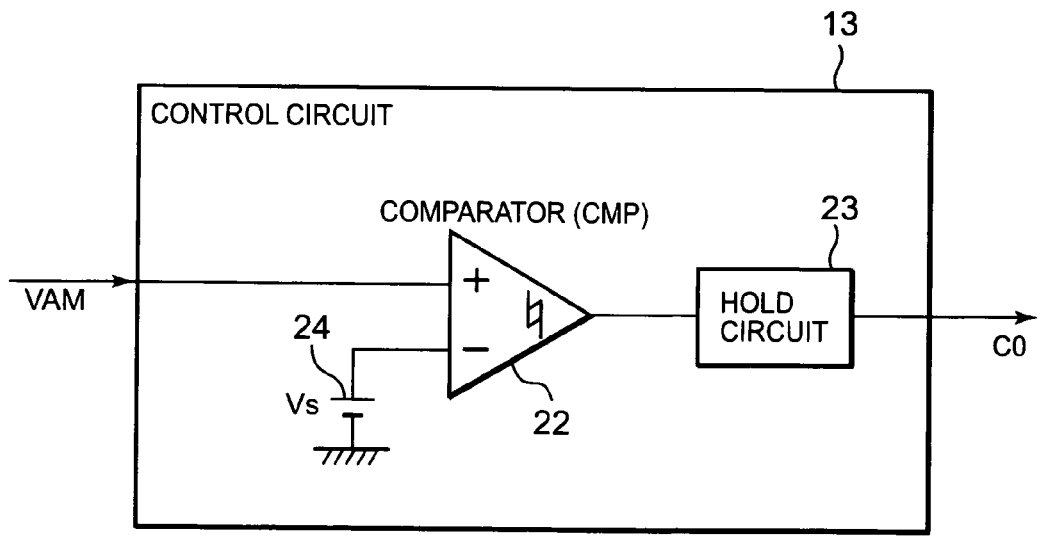
FIG. 7 is a block diagram illustrating a configuration of a control circuit 13 of the first exemplary embodiment.

FIG. 7 is a block diagram illustrating a configuration of the control circuit 13. The control circuit 13 includes a comparator 22 and a hold circuit 23. The hold circuit 23 compares the voltage value of an input signal voltage VAM with a reference voltage supplied from a reference power supply Vs. The hold circuit 23 holds the value of an output from the comparator 22 for a predetermined period of time if the output from the comparator 22 has changed. The control circuit 13 outputs the output value from the hold circuit 23 as a control signal CO. The reference power supply Vs is set to a voltage value equal to the voltage value at the point when the signal voltage VAN reaches an in-rush current limit level (the in-rush current limit level will be described later). The comparator 22 has a hysteresis characteristic in order to provide a noise margin.

Figure 8:
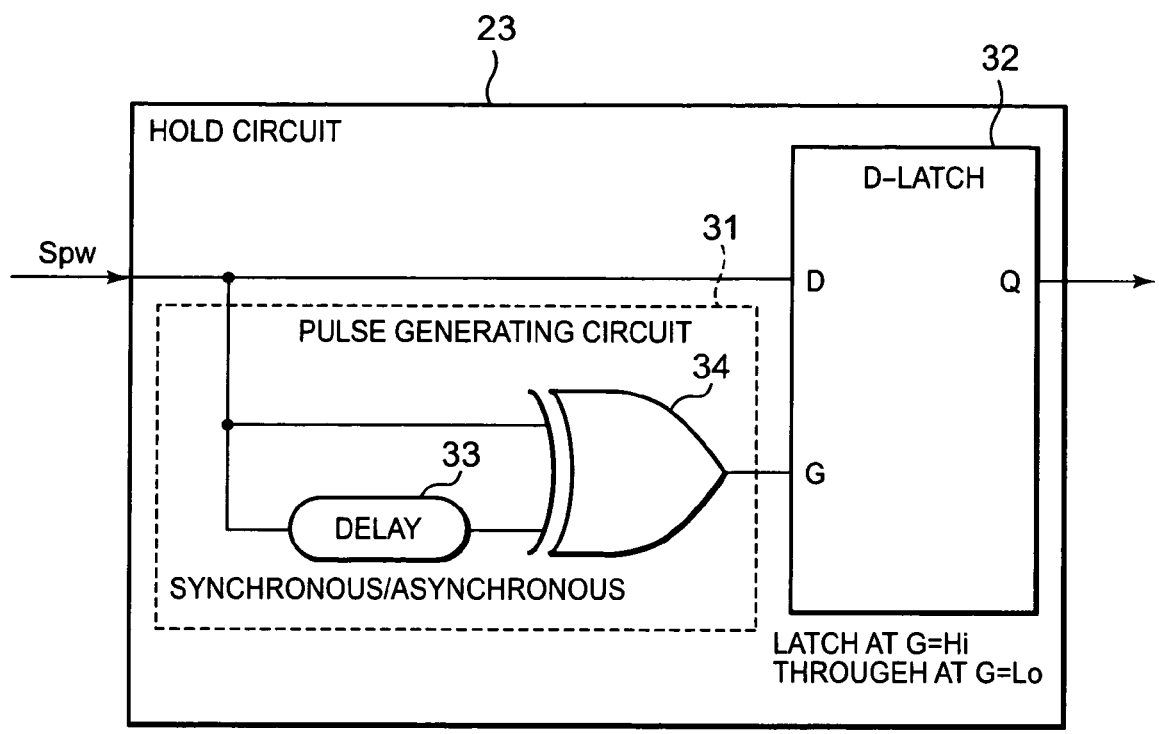
FIG. 8 is a block diagram illustrating a configuration of a hold circuit 23 of the first exemplary embodiment.

FIG. 8 is a block diagram illustrating a configuration of the hold circuit 23. The hold circuit 23 includes a pulse generating circuit 31 and a storage circuit 32. The storage circuit 32 includes terminals D and G. Terminal D receives a signal provided from the comparator 22. Terminal G receives a signal provided from the pulse generating circuit 31.

The pulse generating circuit 31 includes an EXOR circuit 34 having first and second input terminals and a delay circuit 33 connected to the second input terminal. The second input terminal of the EXOR circuit 34 receives a signal provided from the comparator 22. The delay circuit 33 delays the signal by a predetermined time period and the second input terminal receives the delayed signal that changes after the predetermined time period. The EXOR circuit 34 provides the result of operation on the signals input in it to terminal G of the storage circuit 32.

When the input signal has changed, the output from the EXOR circuit 34 goes and remains high for the period of time equivalent to the delay time of the delay circuit 33. The storage circuit 32 directly outputs the value at terminal D to terminal Q when terminal G is low. The storage circuit 32 holds the value that appears at terminal D at the time terminal G changes from low to high for a period of time during which terminal G is high. That is, the hold circuit 23 has the function of holding the value of an input signal for a certain period of time after the input signal has changed and then outputting the value.

In the exemplary embodiment, the delay circuit 33 of the pulse generating circuit 31 that constitutes the hold circuit 23 can be implemented by a synchronous circuit whose delay time can be controlled by a clock in the system. Alternatively, the delay circuit 33 can be implemented by an asynchronous circuit whose delay value is determined by a circuit constant. If the delay circuit 33 is implemented by a synchronous circuit, a delay value can be set externally. Thus, the configuration of the delay circuit 33 in the exemplary embodiment is not limited to a specific one. Therefore, description of a specific circuit configuration of the delay circuit 33 will be omitted in the following description.

Figure 9:
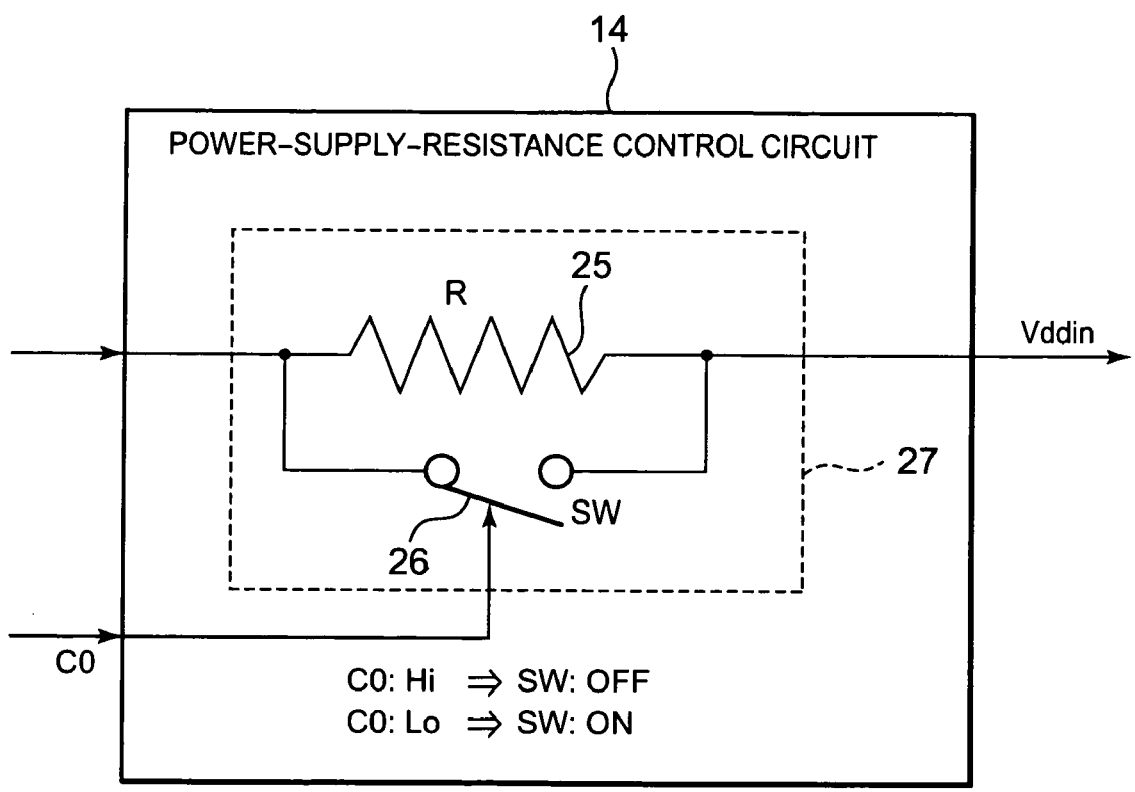
FIG. 9 is a block diagram illustrating a configuration of a power-supply-resistance control circuit 14 of the first exemplary embodiment.

FIG. 9 is a block diagram illustrating a configuration of a power-supply-resistance control circuit 14. The power-supply-resistance control circuit 14 includes a resistance component 27. The resistance component 27 includes a resistance 25 connected in series with a power-supply wiring path and a switch 26 connected in series with the resistance 25. The switch 26 is turned off when the value of the control signal CO goes high and turned on when the value of the control signal CO goes low. That is, when the control signal CO is high, the resistance 25 enters the power-supply wiring path in series; when the control signal CO is low, the resistance 25 connected in series with the power-supply wiring path is removed from the path. The switch 26 may be implemented by a transfer gate consisting of a p-channel MOS transistor or a CMOS transfer gate.

Figure 10:
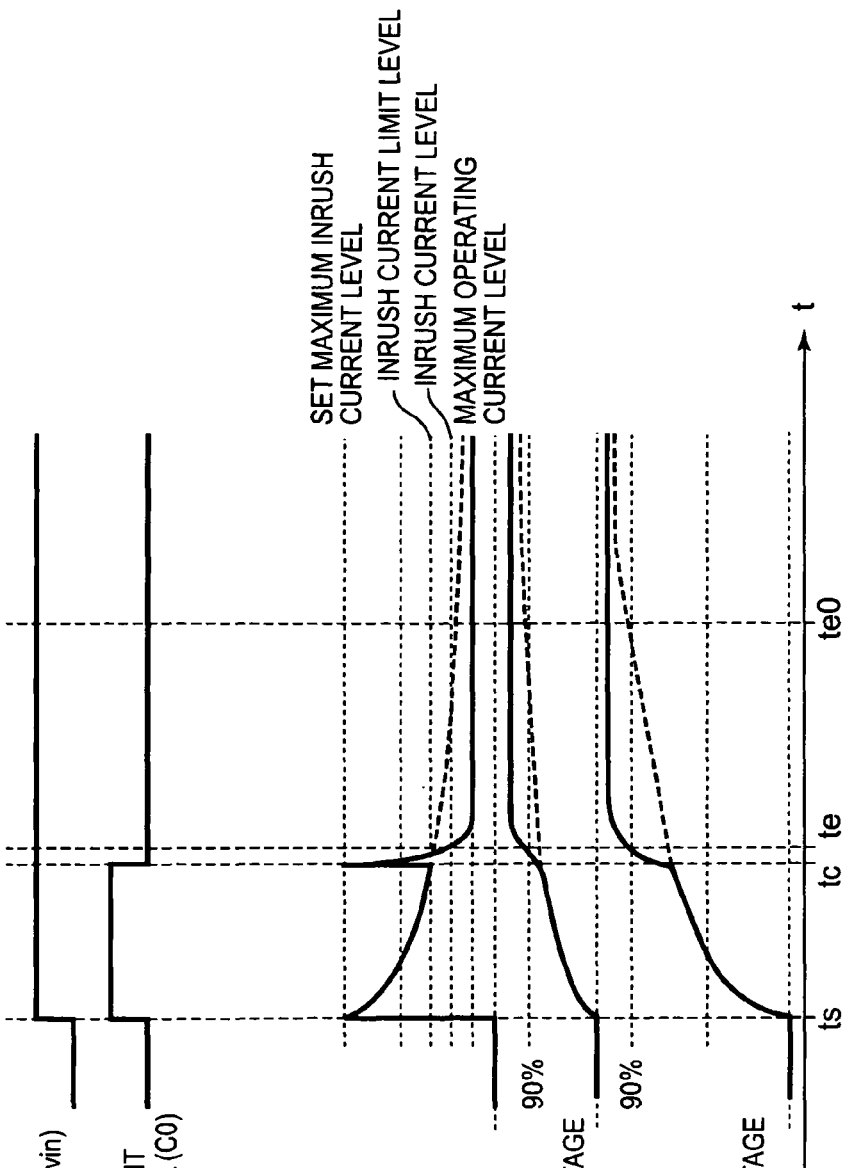
FIG. 10 shows signal waveform charts illustrating operation of the power supply circuit 11 of the first exemplary embodiment.

Operation of the first exemplary embodiment will be described below. FIG. 10 shows signal waveform charts illustrating operation of the first exemplary embodiment. Chart (a) of FIG. 10 shows time variation in an input power supply voltage Vin. Chart (b) of FIG. 10 shows a signal waveform of a control signal CO. Chart (c) of FIG. 10 shows time variation in a power supply current Ivin. Chart (d) of FIG. 10 shows time variation in a voltage (1 times output voltage) from the first terminal Vddin. Chart (e) of FIG. 10 shows time variation in a voltage (2 times output voltage) output from the second terminal Vout.

The set maximum in-rush current level shown in (c) of FIG. 10 is a current value designed as the maximum power-supply current value. The in-rush current limit level is a power-supply current level used in the exemplary embodiment and has a value greater than an in-rush current level. The in-rush current level is a level on the basis of which a conventional power supply circuit judges whether a current is an in-rush current or a normal current. The maximum operating current level is the maximum value of the normal operating current. In the exemplary embodiment, an example will be described in which the in-rush current level is set to a value approximately twice the maximum operating current level.

Letting VL(V) be the voltage value of the power supply voltage output at power-on, that is, the voltage on the capacitive load (15), C(F) be the negative capacitance viewed from the power supply, Q(C) be its charge, and i(A) be the current flowing through the load, then Equation (2) holds:

$$VL = Q/C, \quad Q = Q0 + \int i \, dt \qquad (2)$$

Here, Q0 is the amount of initial charge on the load at the power-on and the time quadrature of the current i is the definite integral for the time period between the power-on and the observation time point.

The control circuit 13 detects occurrence of an in-rush current and sets the control signal CO high when the value of the power supply current Ivin exceeds the in-rush current limit level. At this point of time, the resistance 25 in the power-supply-resistance control circuit 14 is connected in series. As a result, the maximum value of the power supply current Ivin rises to a value lower than or equal to the set maximum in-rush current level. The capacitive load 15 is gradually charged by the power supply current Ivin according to Equation (2). Accordingly, the value of the power supply current Ivin gradually decreases. The value can be approximated as $$Ivin \approx (Vin - VL)/R \qquad (3)$$

When the power supply current Ivin decreases to the in-rush current limit level, the control circuit 13 sets the output control signal CO low. Then, the switch 26 of the power-supply-resistance control circuit 14 shorts the input and output of the resistance 25. This removes the series resistance in the power-supply wiring path and therefore the power supply current Ivin increases again according to Equation (3).

Here, the in-rush current limit level and the voltage of the reference power supply Vs are set so that the maximum value of the power supply current Ivin becomes lower than or equal to the set maximum in-rush current level. The voltage value of the reference power supply Vs for a particular display device can be designed by calculation (simulation) or actual measurement.

The hold circuit 23 prevents the power supply current Ivin that has increased again from being judged to be the onset of an in-rush current. The delay value which is determined by the delay circuit 33 in the pulse generating circuit 31 of the hold circuit 23 is set to a value greater than the time period between time tc and time te and smaller than the time period between time ts and time tc to prevent the control circuit 13 from judging the power supply current Ivin measured at the power-supply-current measuring circuit 12 to be the onset of an in-rush current to increase the resistance of the power-supply-resistance control circuit 14 again.

As has been described, the power supply circuit 11 of the exemplary embodiment charges the load by a constant current source having the maximum current value that is tolerated as the maximum in-rush current flowing at power-on and, when the load is charged to a specified voltage, the power supply circuit 111 deactivates the constant power supply source and shorts its input and output. Accordingly, in the power supply circuit 11 of the exemplary embodiment, the power supply current Ivin drops to the in-rush current limit level and, after a lapse of certain time, increases again, therefore the capacitive load is charged quicker than before and the output voltage at the first terminal Vddin quickly approaches a specified voltage value.

Referring to FIG. 10, time te0 is the time at which a voltage output without using the present invention reaches a specified value, which is 90% of the final voltage, and time te is the time at which a voltage output using the present invention reaches 90%. In the case of using the present invention, the output voltage reaches the specified value earlier by a period of time te0-te.

Second Exemplary Embodiment

Figure 11:
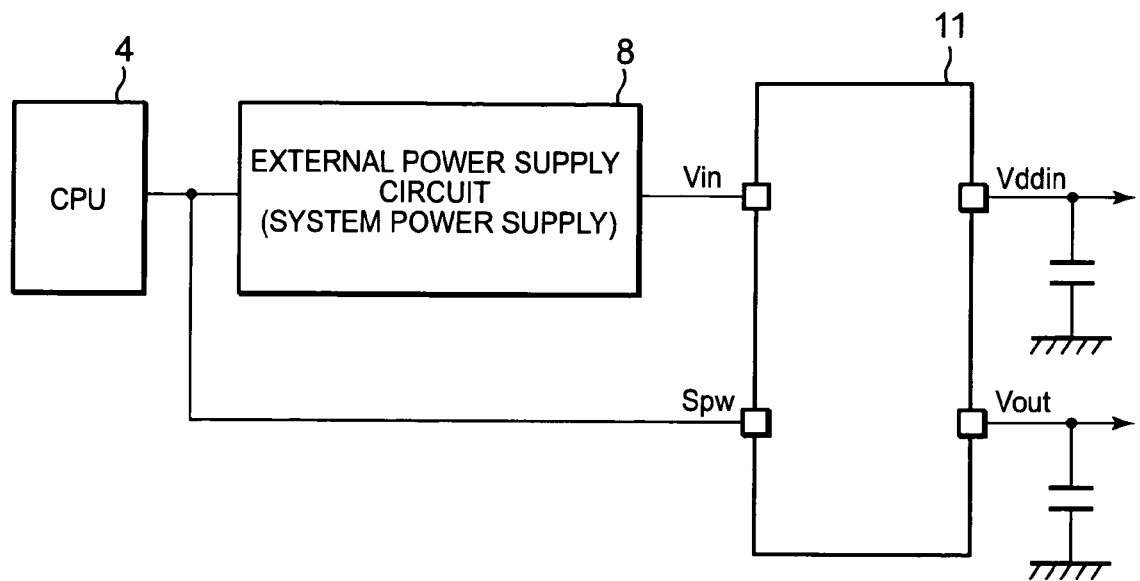
FIG. 11 is a block diagram illustrating a configuration of a power supply system including a power supply circuit 11 in a second exemplary embodiment.

FIG. 11 is a block diagram illustrating a configuration of a power supply system including a power supply circuit 11 according to the second exemplary embodiment. The power supply system in the second exemplary embodiment includes an external power supply circuit (system power supply) and the power supply circuit 11. The external power supply circuit (system power supply) in the second exemplary embodiment is provided outside the power supply circuit 11 like the power supply IC 8 described previously, for example. The external power supply circuit (system power supply) is turned on in response to a power-on signal Spw which is output from a CPU 4. After turned on, the external power supply circuit (system power supply) supplies an input power supply voltage Vin to the power supply circuit 11 of the second exemplary embodiment.

In the second exemplary embodiment, the power-on signal Spw is also input in the power supply circuit 11. The external power supply circuit (system power supply) takes time to start supplying the input power supply voltage Vin after it has received the power-on signal Spw. Therefore, the power supply circuit 11 of the second exemplary embodiment receives the power-on signal Spw before the input power supply voltage Vin is supplied to it.

Figure 12:
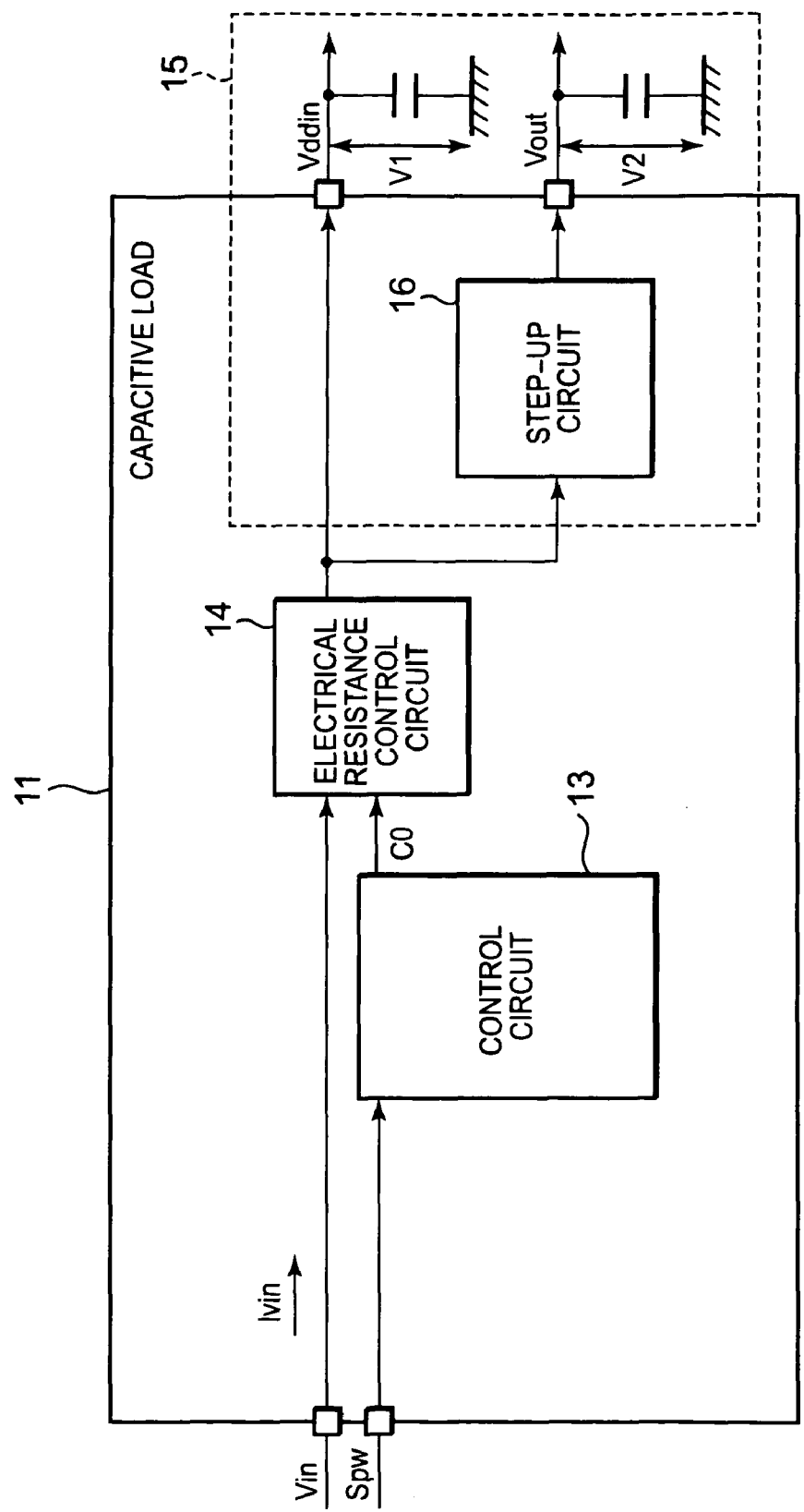
FIG. 12 is a block diagram illustrating a configuration of the power supply circuit 11 of the second exemplary embodiment.

FIG. 12 is a block diagram illustrating a configuration of the power supply circuit 11 of the second exemplary embodiment. An externally input power-on signal Spw is input into a control circuit 13 in the second exemplary embodiment.

Figure 13:
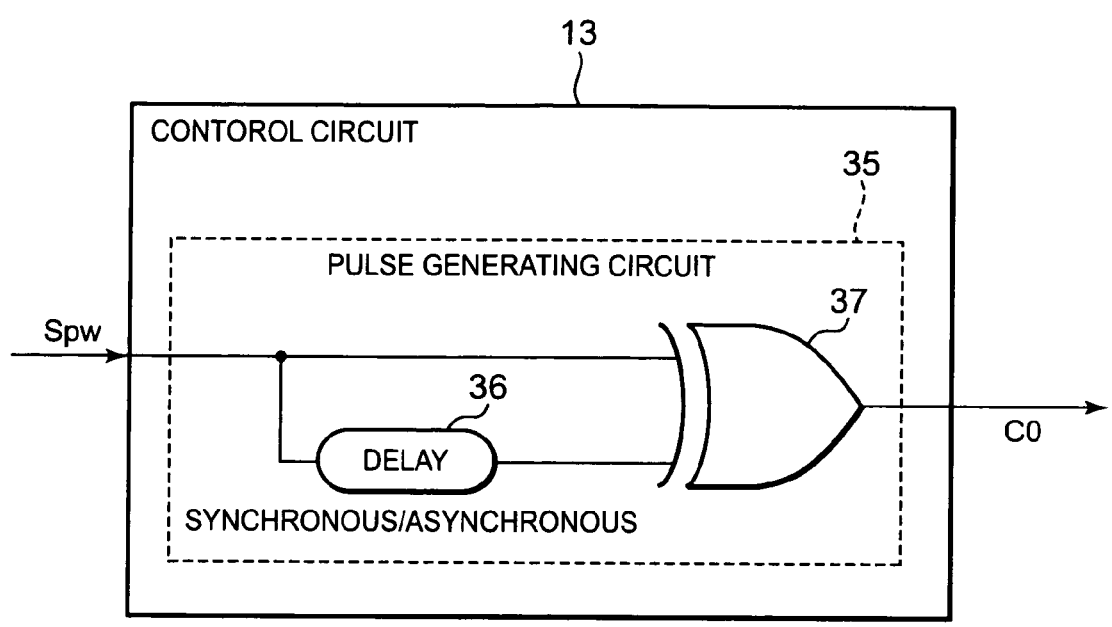
FIG. 13 is a block diagram illustrating a configuration of a control circuit 13 of the second exemplary embodiment.

FIG. 13 is a block diagram illustrating a configuration of the control circuit 13 of the second exemplary embodiment. The control circuit 13 includes a pulse generating circuit 35. The pulse generating circuit 35 includes an EXOR circuit 37 having first and second input terminals, and a delay circuit 36 connected to the second input terminal. The second input terminal of the EXOR circuit 37 receives a power-on signal Spw. A delay circuit 36 delays the signal by a predetermined time period and the second input terminal receives the delayed power-on signal Spw signal that changes after the predetermined time period. The pulse generating circuit 35 generates and outputs as a control signal CO a pulse having a width equal to a delay value of the delay circuit 36.

The delay value of the delay circuit 36 can be implemented by a synchronous circuit whose delay time can be controlled by a clock in the system or an asynchronous circuit whose delay value is determined by a circuit constant. If it is implemented by a synchronous circuit, the delay value can be externally set. The configuration of the delay circuit 36 in the exemplary embodiment is not limited to a specific one and therefor specific description of the delay circuit 36 will be omitted. The value of the delay circuit 36 is preferably designed by calculation (simulation) or actual measurement such that the power supply current Ivin becomes lower than or equal to a set maximum in-rush current level when the resistance of the power-supply-resistance control circuit 14 has decreased.

Figure 14:
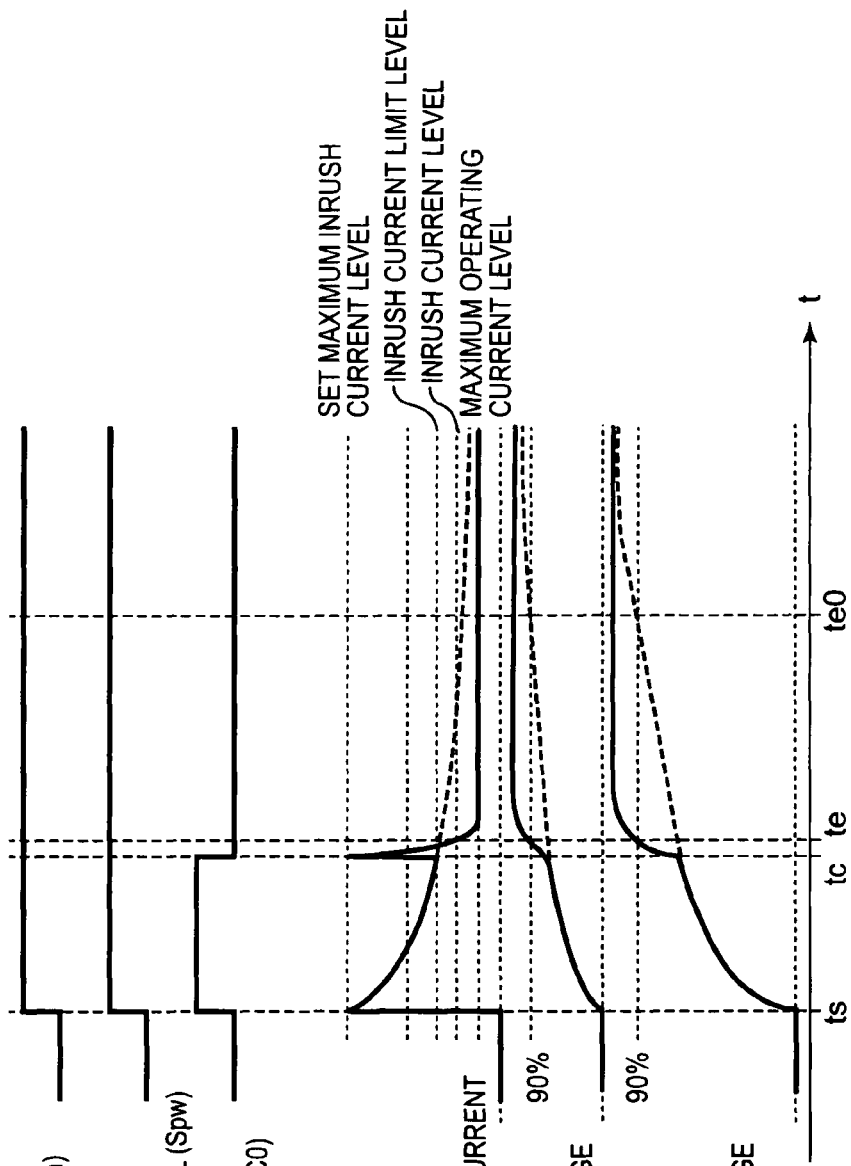
FIG. 14 shows signal waveform charts illustrating operation of the second exemplary embodiment.

FIG. 14 shows signal waveform charts illustrating operation of the second exemplary embodiment. As shown in FIG. 14, the power supply circuit 11 of the second exemplary embodiment can quickly sets the output voltage to a specified value while controlling an in-rush current in a manner similar to that of the power supply circuit 11 of the first exemplary embodiment.

Functions of the present invention can be implemented by a simpler circuit if a power-on signal Spw can be provided from an external source as in the power supply circuit 11 of the second exemplary embodiment. Furthermore, the power supply circuit 11 of the second exemplary embodiment is capable of causing the control circuit 13 and the power-supply-resistance control circuit 14 to operate on the basis of a power-on signal Spw to increase the power-supply resistance before the input power supply voltage Vin is risen. Therefore, an in-rush current that flows immediately after power-on can be controlled.

Third Exemplary Embodiment

Figure 15:
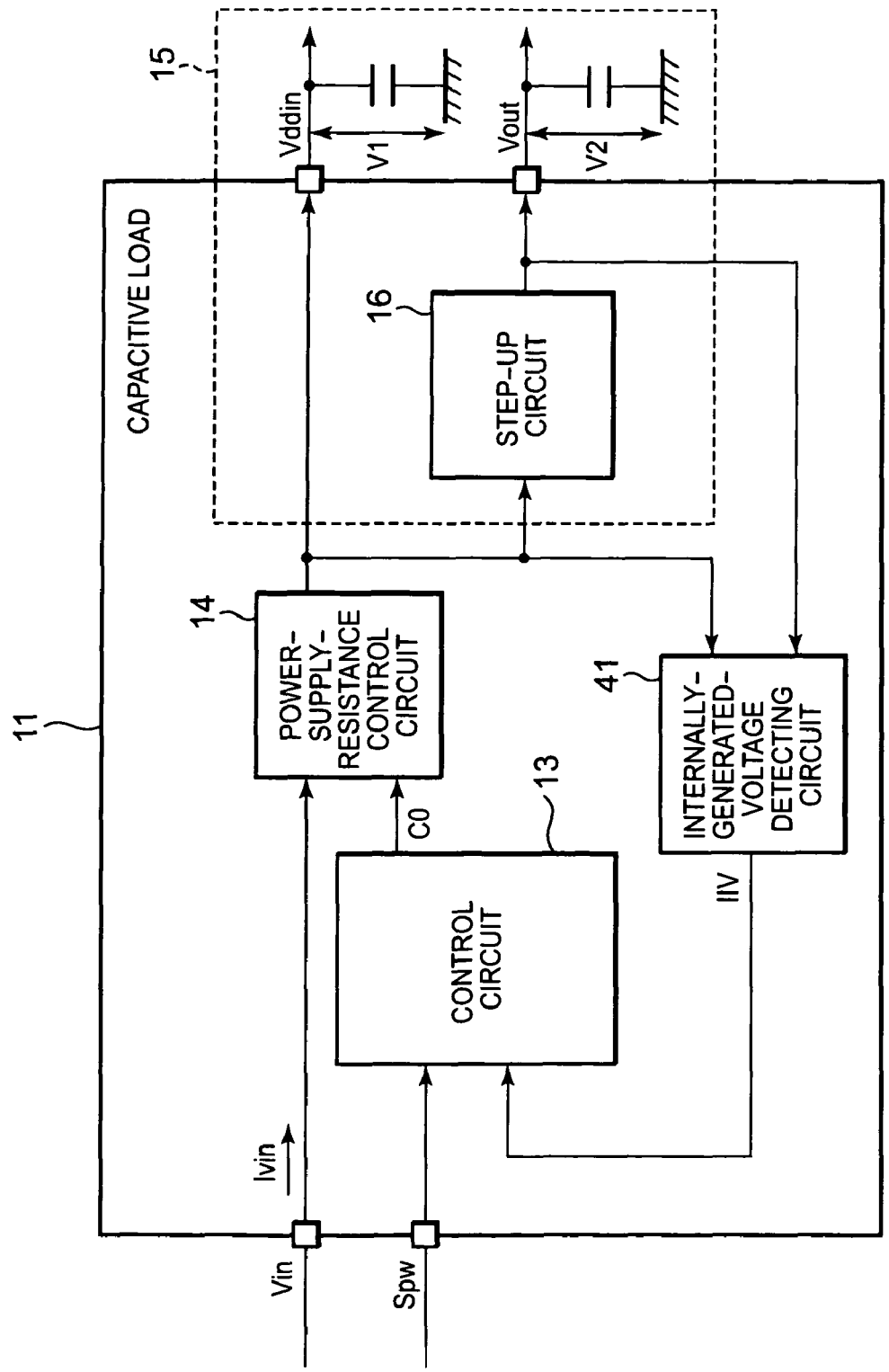
FIG. 15 is a block diagram illustrating a configuration of a power supply circuit 11 of a third exemplary embodiment.

FIG. 15 is a block diagram illustrating a configuration of a power supply circuit 11 according to the third exemplary embodiment. The power supply circuit 11 of the third exemplary embodiment includes, in addition to the components of the power supply circuit 11 of the second exemplary embodiment, an internally-generated-voltage detecting circuit 41. The internally-generated-voltage detecting circuit 41 monitors and processes voltages (first and second voltages V1, V2) of two capacitors, which are capacitive loads, and inputs a detection signal IIV based on the result into a control circuit 13. The operation of the control circuit 13 of increasing the power-supply resistance in response to a power-on signal Spw before the rise of an input Vin is the same as that in the second exemplary embodiment.

Figure 16:
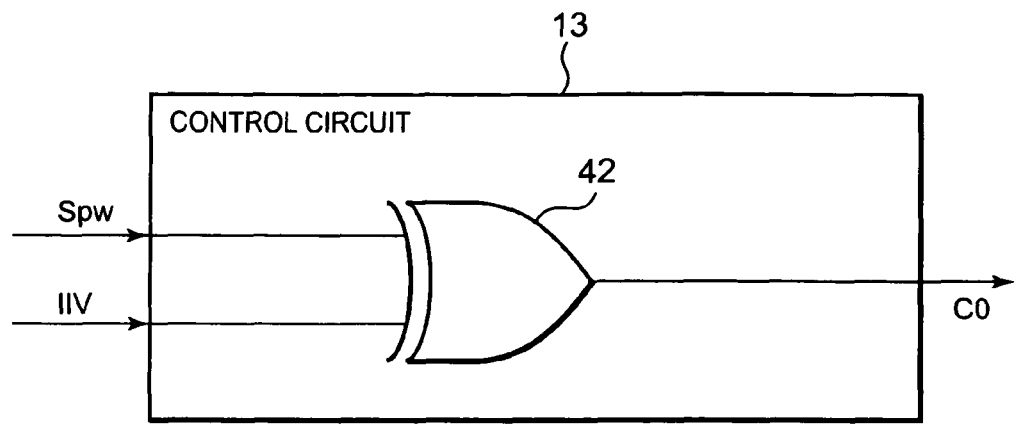
FIG. 16 is a block diagram illustrating a configuration of a control circuit 13 of the third exemplary embodiment.

FIG. 16 is a block diagram illustrating a configuration of the control circuit 13 of the third exemplary embodiment. The control circuit 13 includes an EXOR circuit 42. The EXOR circuit 42 have two inputs: the power-on signal Spw and the detection signal IIV output from the internally-generated-voltage detecting circuit 41. The control circuit 13 outputs an output from the EXOR circuit 42 as a control signal CO.

Figure 17:
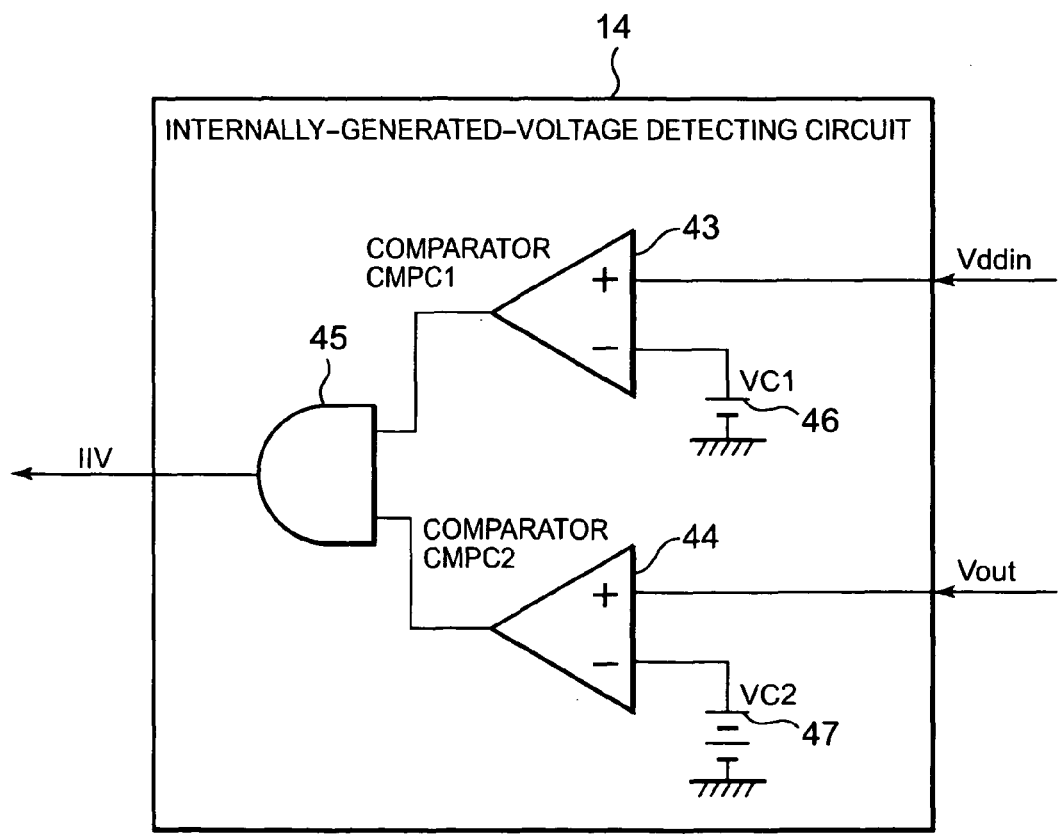
FIG. 17 is a block diagram illustrating a configuration of an internally-generated-voltage detecting circuit 41.

FIG. 17 is a block diagram illustrating a configuration of the internally-generated-voltage detecting circuit 41. The internally-generated-voltage detecting circuit 41 is connected to a first terminal Vddin and a second terminal Vout. The internally-generated-voltage detecting circuit 41 includes a first comparator 43, a second comparator 44, and an AND circuit 45. The first comparator 43 compares a charge voltage (first voltage V1) of a capacitance connected to the first terminal Vddin with a reference voltage VC1 provided from a first voltage source 46 and outputs the result of the comparison to the AND circuit 45. The second comparator 44 compares a charge voltage (second voltage V2) of a capacitance connected to the second terminal Vout with a reference voltage VC2 provided from a second voltage source 47 and provides the result of the comparison to the AND circuit 45. The AND circuit 45 outputs a high level signal as the detection signal IIV of the internally-generated-voltage detecting circuit 41 when the first voltage V1 becomes higher than or equal to the reference voltage VC1 and the second voltage V2 becomes higher than or equal to the reference voltage VC2. The reference voltages VC1 and VC2 are designed by calculation (simulation) so that the maximum value of power supply current Ivin becomes lower than or equal to a set maximum in-rush current level when the resistance of a power-supply-resistance control circuit 14 has dropped. Alternatively, the voltage values may be externally set on the basis of actual measurement.

Figure 18:
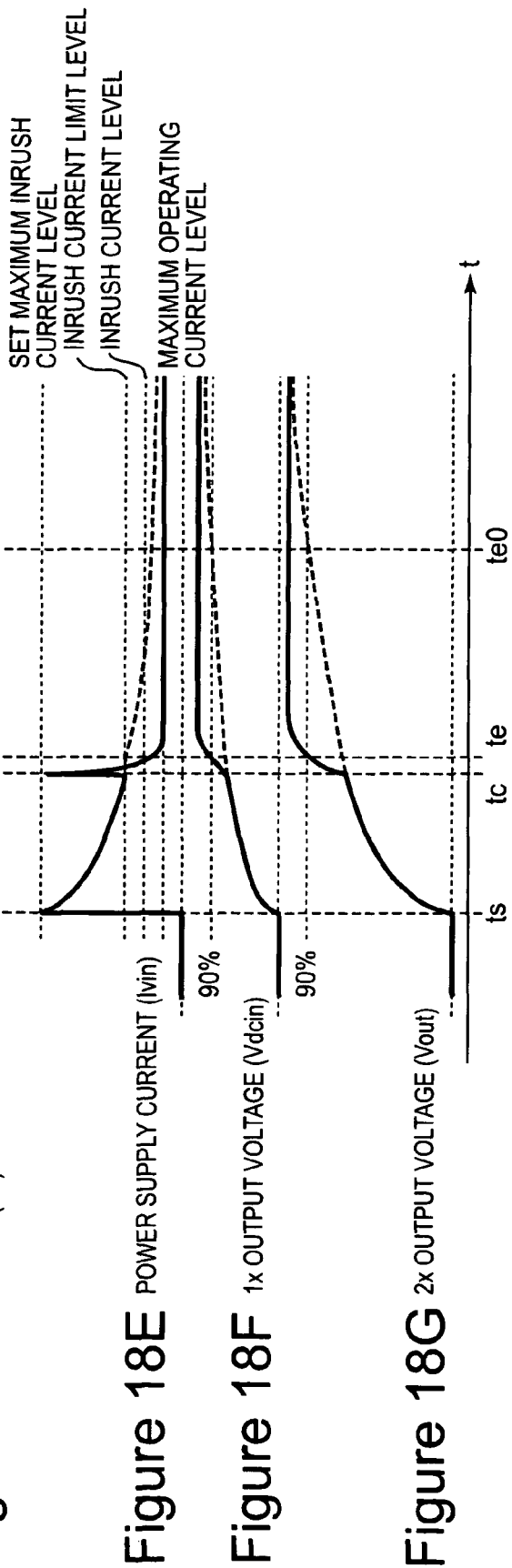
FIG. 18 shows signal waveform charts illustrating operation of the third exemplary embodiment.

FIG. 18 shows signal waveform charts illustrating operation of the third exemplary embodiment. As shown in FIG. 18, the power supply circuit 11 of the third exemplary embodiment, like the power supply circuits 11 of the first and second exemplary embodiments, can quickly set an output voltage to a specified value by obtaining, from the voltages at the first terminal Vddin and second terminal Vout, timing at which the power-supply resistance of the power-supply-resistance control circuit 14 is to be reduced while keeping the power supply current Ivin at a level lower than or equal to the set maximum in-rush current level.

In the power supply circuit 11 of the third exemplary embodiment, more accurate power-supply resistance switching can be accomplished by determining the timing of switching the resistance of the power-supply-resistance control circuit 14 on the basis of more practical, internally generated voltages (the voltages at the first terminal Vddin and the second terminal Vout).

Fourth Exemplary Embodiment

Figure 19:
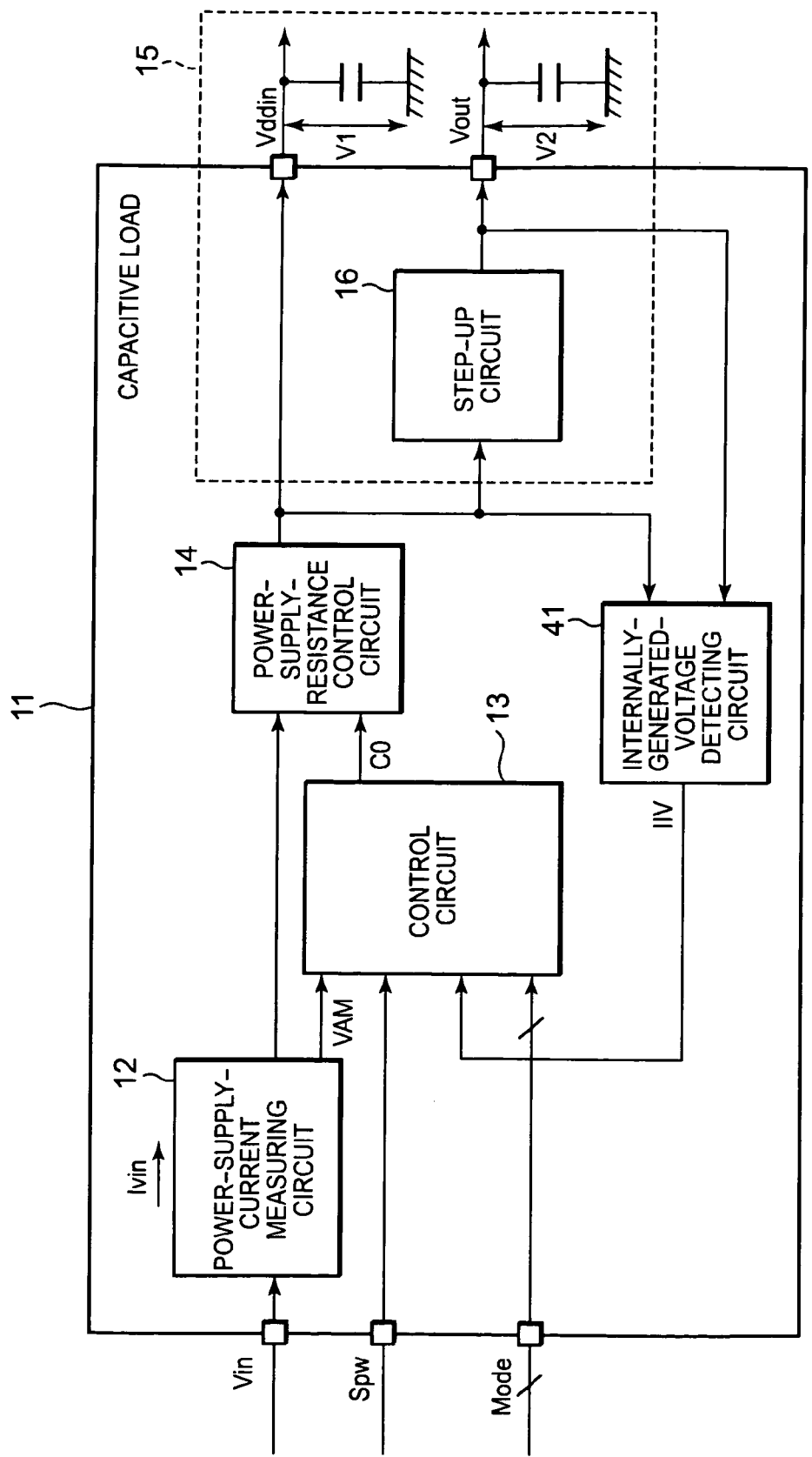
FIG. 19 is a block diagram illustrating a configuration of a power supply circuit 11 of a fourth exemplary embodiment.

FIG. 19 is a block diagram illustrating a configuration of a power supply circuit 11 of the fourth exemplary embodiment of the present invention. Referring to FIG. 19, the power supply circuit 11 of the fourth exemplary embodiment includes a power-supply-current measuring circuit 12, a control circuit 13, a power-supply-resistance control circuit 14, and an internally-generated-voltage detecting circuit 41. The power-supply-current measuring circuit 12 and the power-supply-resistance control circuit 14 have the same configurations as the power-supply-current measuring circuit 12 and the power-supply-resistance control circuit 14 of the first exemplary embodiment. The CPU 41 has the same configuration as that in the third exemplary embodiment. In the fourth exemplary embodiment, a mode selection signal Mode is provided from an external source to the control circuit 13.

Figure 20:
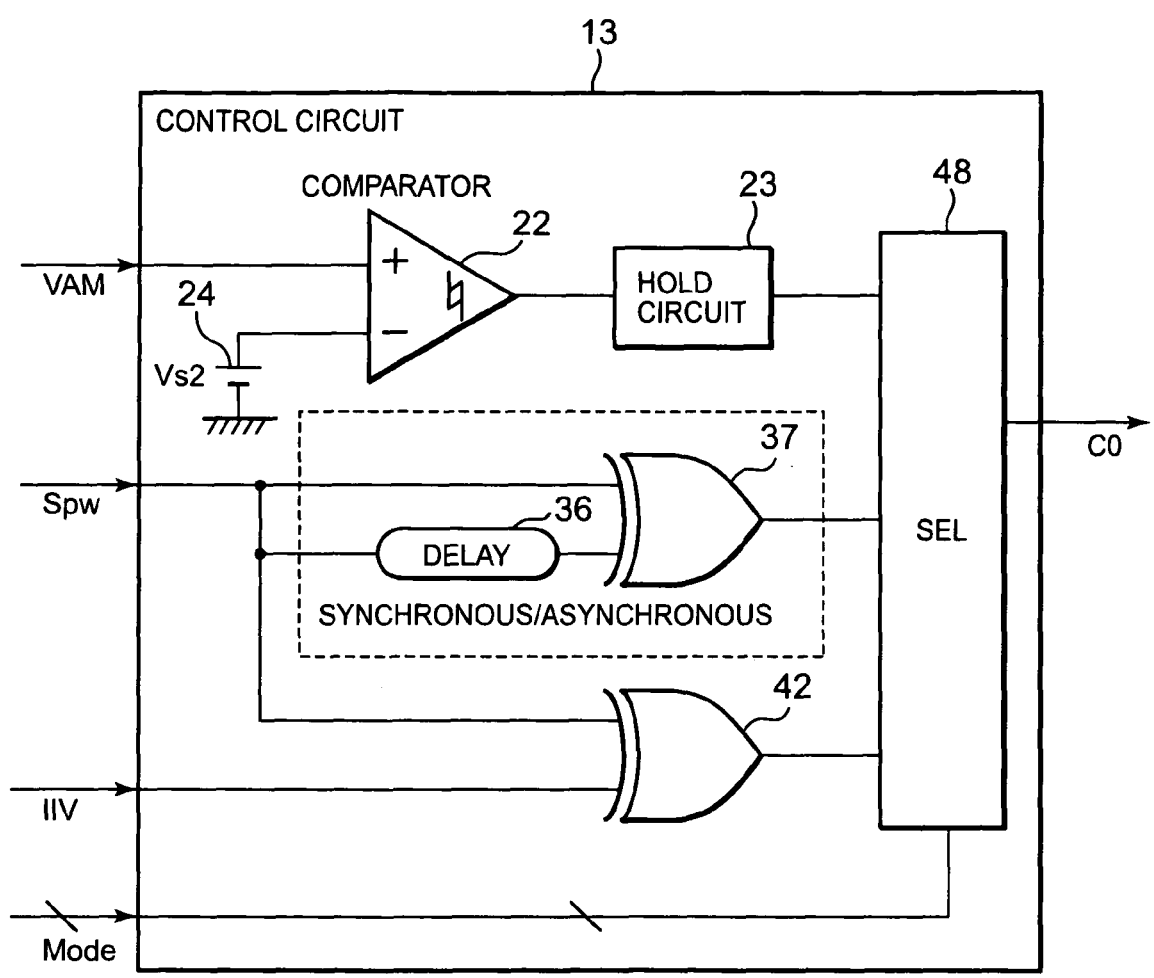
FIG. 20 is a block diagram illustrating a configuration of a control circuit 13 of the fourth exemplary embodiment.

FIG. 20 is a block diagram illustrating a configuration of the control circuit 13 of the fourth exemplary embodiment. The control circuit 13 of the fourth exemplary embodiment includes a selector 48 (3-in-1 selector). The control circuit 13 also includes a first circuit block including a comparator 22, a hold circuit 23, and a voltage source 24, a second circuit block including a delay circuit 36 and an EXOR circuit 37, and a third circuit block including an EXOR circuit 42.

Provided to the selector 48 are an output from the hold circuit 23, an output from the EXOR circuit 37, and an output from the EXOR circuit 42. The selector 48 selects an output to be output to the power-supply-resistance control circuit 14 as a control signal CO on the basis of the mode selection signal Mode. Operation of the power supply circuit 11 in response to the control signal CO is the same as the operations of the first to third exemplary embodiments. In the fourth exemplary embodiment, the power supply circuit 11 is capable of selecting an operation mode most suitable for a particular device.

Fifth Exemplary Embodiment

Figure 21:
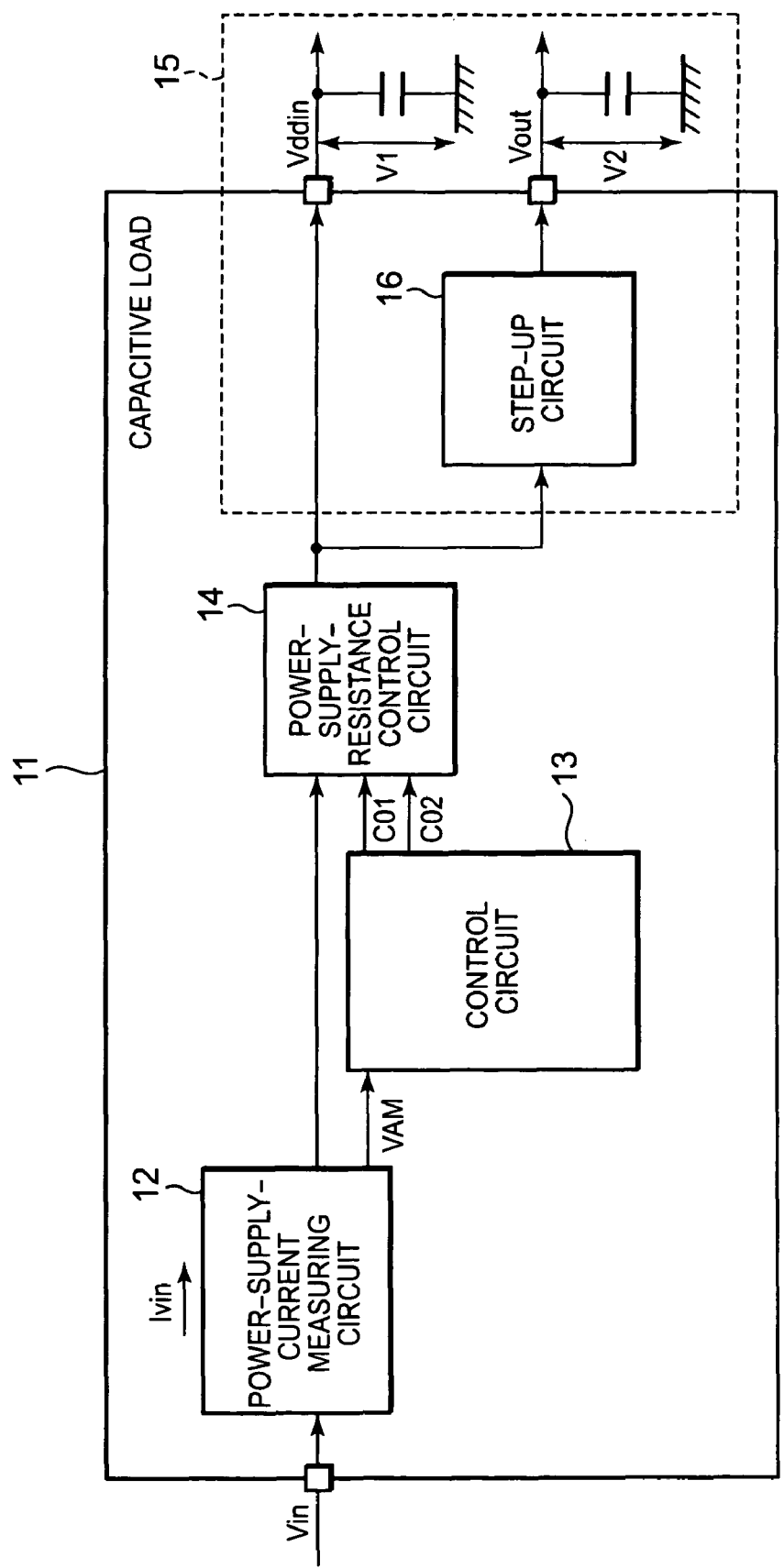
FIG. 21 is a block diagram illustrating a configuration of a power supply circuit 11 of a fifth exemplary embodiment.

FIG. 21 is a block diagram illustrating a configuration of a power supply circuit 11 according to the fifth exemplary embodiment. A control circuit 13 in the fifth exemplary embodiment provides a first control signal CO1 and a second control signal CO2 to a power-supply-resistance control circuit 14. The power-supply-resistance control circuit 14 in the fifth exemplary embodiment stepwise changes a resistance in response to the first control signal CO1 and the second control signal CO2.

Figure 22:
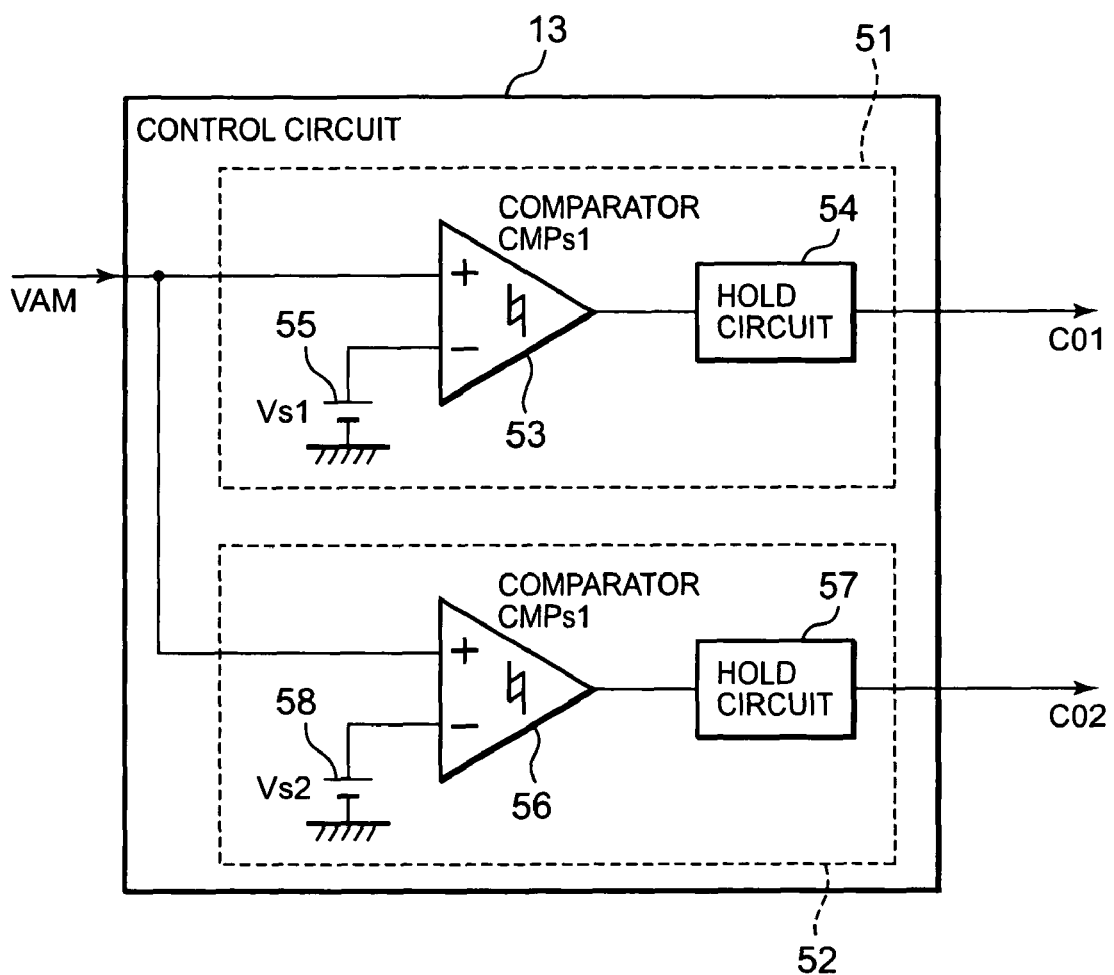
FIG. 22 is a block diagram illustrating a configuration of a control circuit 13 of the fifth exemplary embodiment.

FIG. 22 is a block diagram illustrating a configuration of the control circuit 13 of the fifth exemplary embodiment. The control circuit 13 of the fifth exemplary embodiment includes a first control signal generating circuit 51 generating a first control signal CO1 and a second control signal generating circuit 52 generating a second control signal CO2. The first control signal generating circuit 51 includes a first comparator 53 and a first hold circuit 54. The second control signal generating circuit 52 includes a second comparator 56 and a second hold circuit 57.

The first comparator 53 receives a signal voltage VAM output from a power-supply-current measuring circuit 12, compares the signal voltage VAM with a reference voltage Vs1 from a first voltage source 55 and provides the result of the comparison to the first hold circuit 54. The first hold circuit 54 outputs the first control signal CO1 on the basis of the result of the comparison provided from the first comparator 53. Similarly, the second comparator 56 receives the signal voltage VAM output from the power-supply-current measuring circuit 12, compares the signal voltage VAM with a reference voltage Vs2 from a second voltage source 58, and outputs the result of the comparison to the second hold circuit 57. The second hold circuit 57 outputs the second control signal CO2 on the basis of the result of the comparison provided from the second comparator 56.

Figure 23:
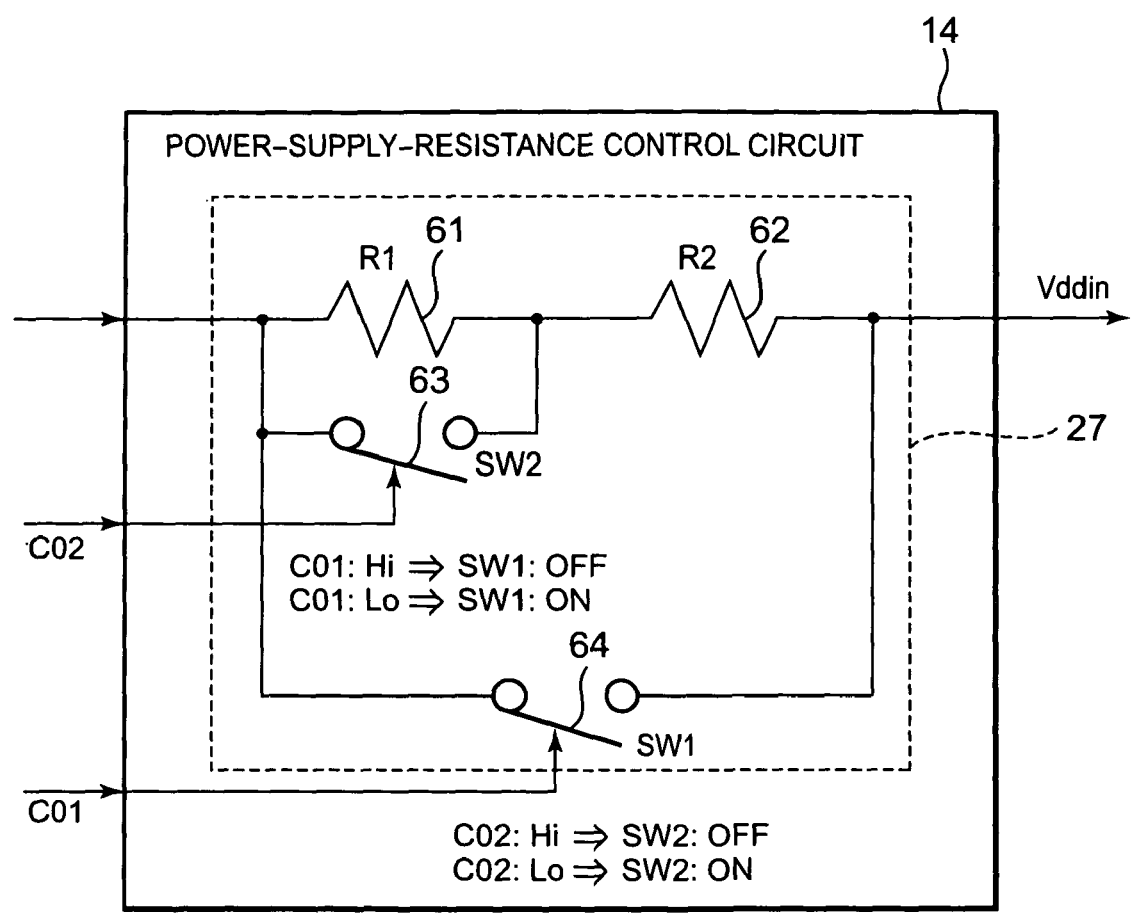
FIG. 23 is a block diagram illustrating a configuration of a power-supply-resistance control circuit 14 of the fifth exemplary embodiment.

FIG. 23 is a block diagram illustrating a configuration of the power-supply-resistance control circuit 14 of the fifth exemplary embodiment. The power-supply-resistance control circuit 14 includes a resistance component 27. The resistance component 27 includes a first resistance 61, a second resistance 62, a first switch 63, and a second switch 64. As can be seen from FIG. 23, the power-supply-resistance control circuit 14 has three power resistance settings, R1+R2, R2, and approximately 0 (there remains an on-resistance of the switches) according to the first control signal CO1 and the second control signal CO2.

Figure 24:
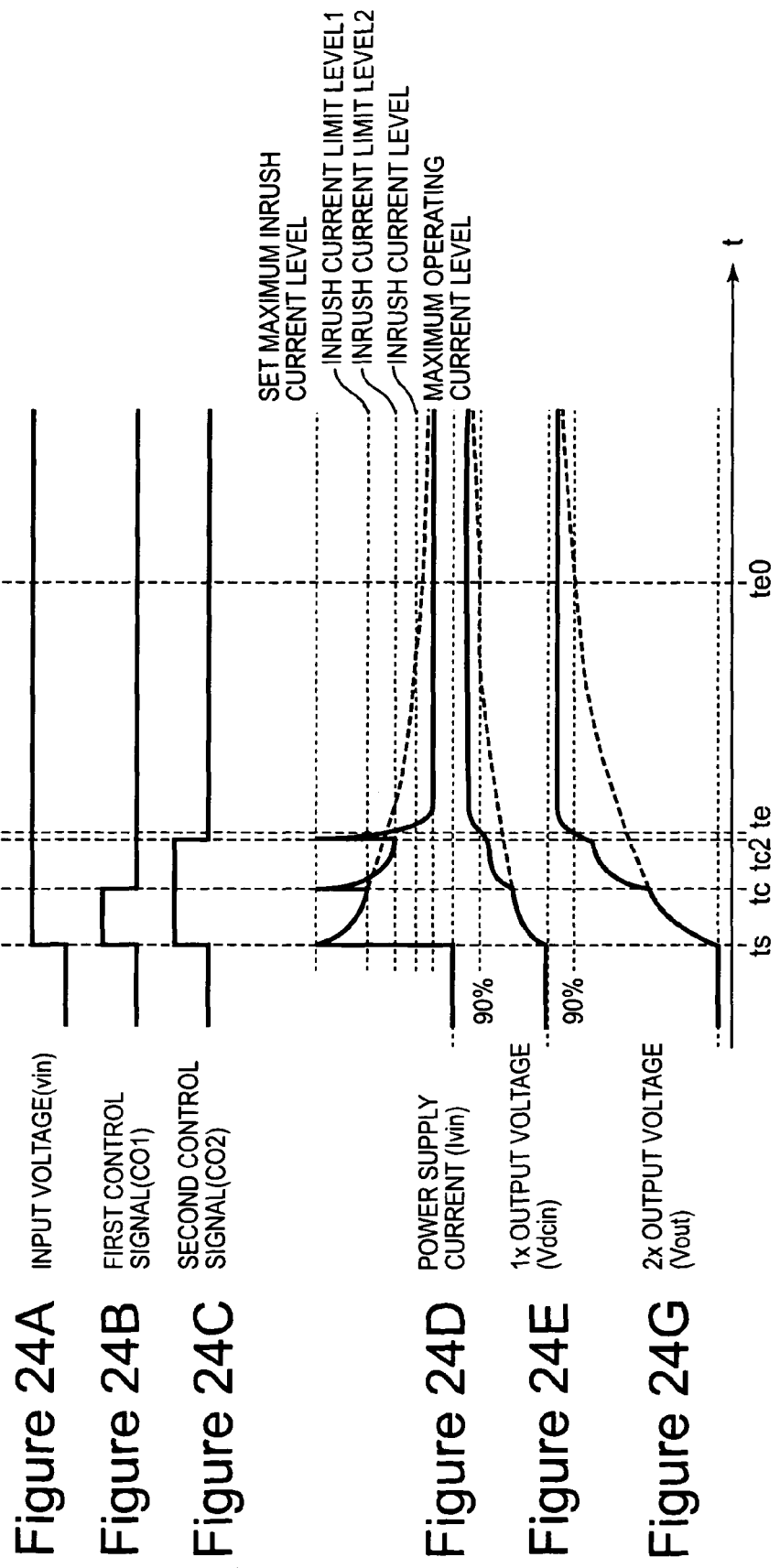
FIG. 24 shows signal waveform charts illustrating operation of the fifth exemplary embodiment.

FIG. 24 shows signal waveform charts illustrating operation of the fifth exemplary embodiment. The power supply circuit 11 of the fifth exemplary embodiment is capable of quickly setting an output voltage to a specified value as compared with a power supply circuit in which the power supply voltage is changed in two levels.

Sixth Exemplary Embodiment

Figure 25:
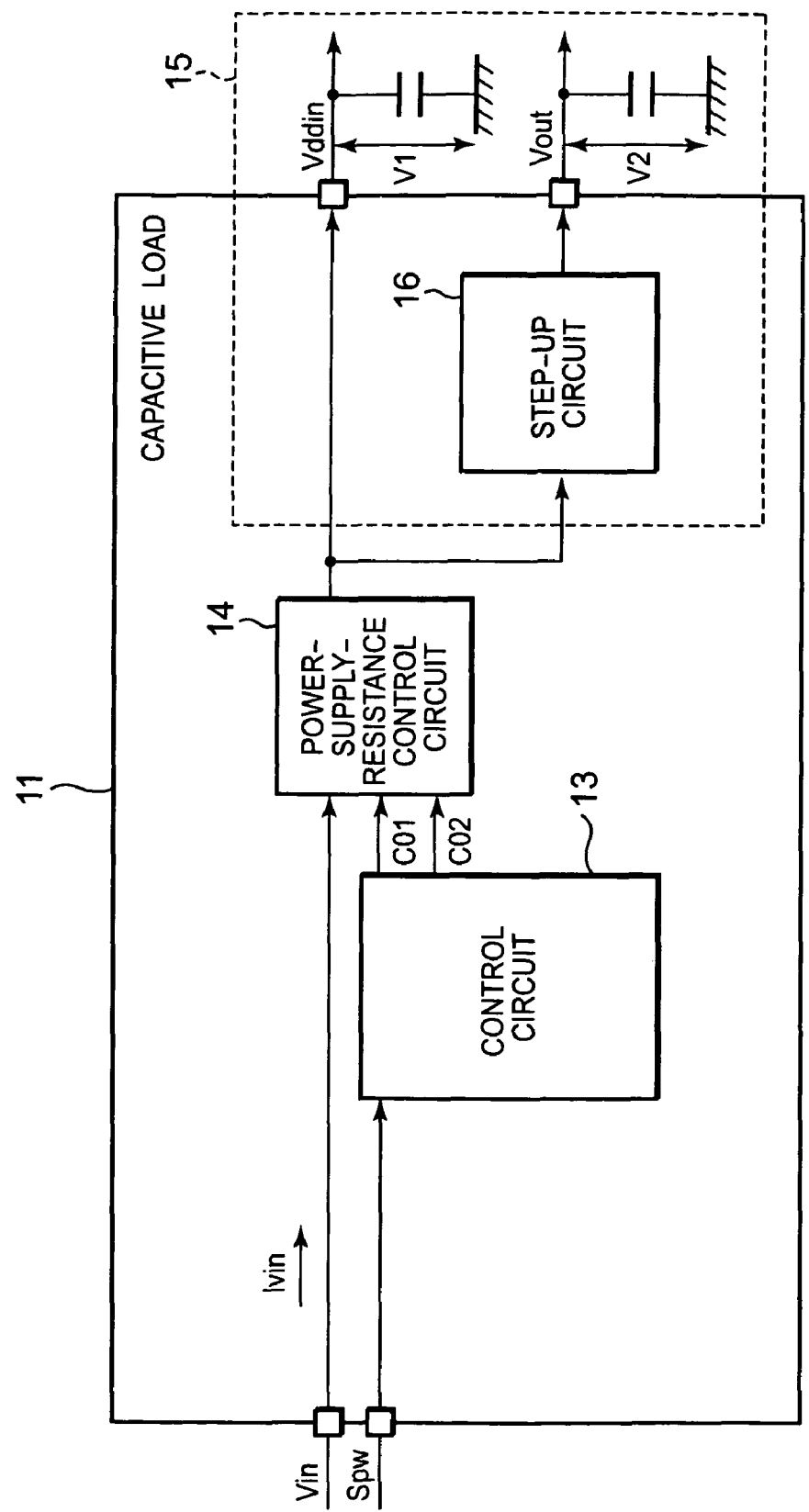
FIG. 25 is a block diagram illustrating a configuration of a power supply circuit 11 of a sixth exemplary embodiment.

FIG. 25 is a block diagram illustrating a configuration of a power supply circuit 11 according to the sixth exemplary embodiment. The basic configuration of the power supply circuit 11 of the sixth exemplary embodiment is the same as that of the power supply circuit 11 of the second exemplary embodiment. A control circuit 13 in the sixth exemplary embodiment can reduce the resistance of a power-supply-resistance control circuit 14 in two levels without depending on a signal voltage VAM.

Figure 26:
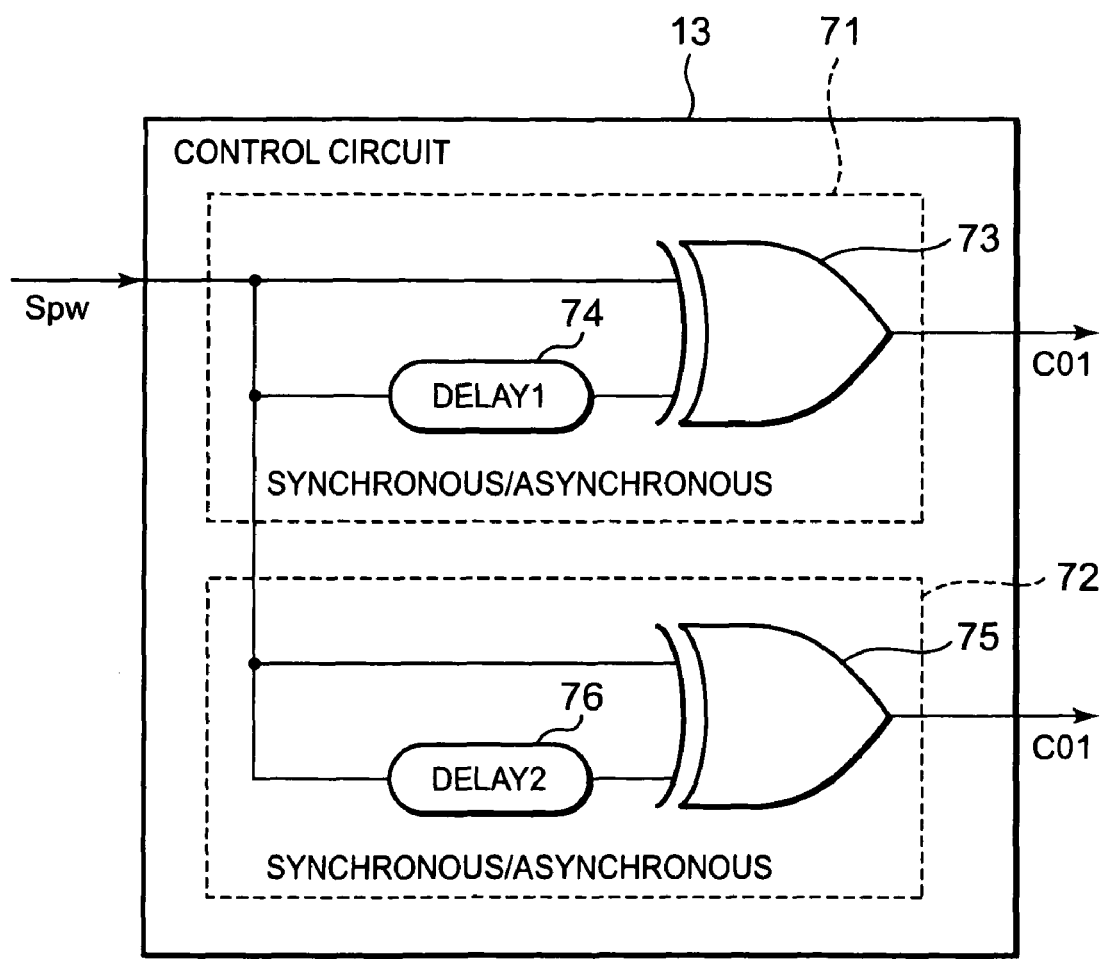
FIG. 26 is a block diagram illustrating a configuration of a control circuit 13 of the sixth exemplary embodiment.

FIG. 26 is a block diagram illustrating a configuration of the control circuit 13 of the sixth exemplary embodiment. The control circuit 13 of the sixth exemplary embodiment includes a first control signal generating circuit 71 and a second control signal generating circuit 72. The first control signal generating circuit 71 includes a first EXOR circuit 73 and a first delay circuit 74 and sets an optimum delay value of the first delay circuit 74 to output a signal similar to the first control signal CO1 of the fifth exemplary embodiment. The second control signal generating circuit 72 includes a second EXOR circuit 75 and a second delay circuit 76 and sets an optimum delay value of the second delay circuit 76 to output a signal similar to the second control signal CO2 of the fifth exemplary embodiment.

Seventh Exemplary Embodiment

Figure 27:
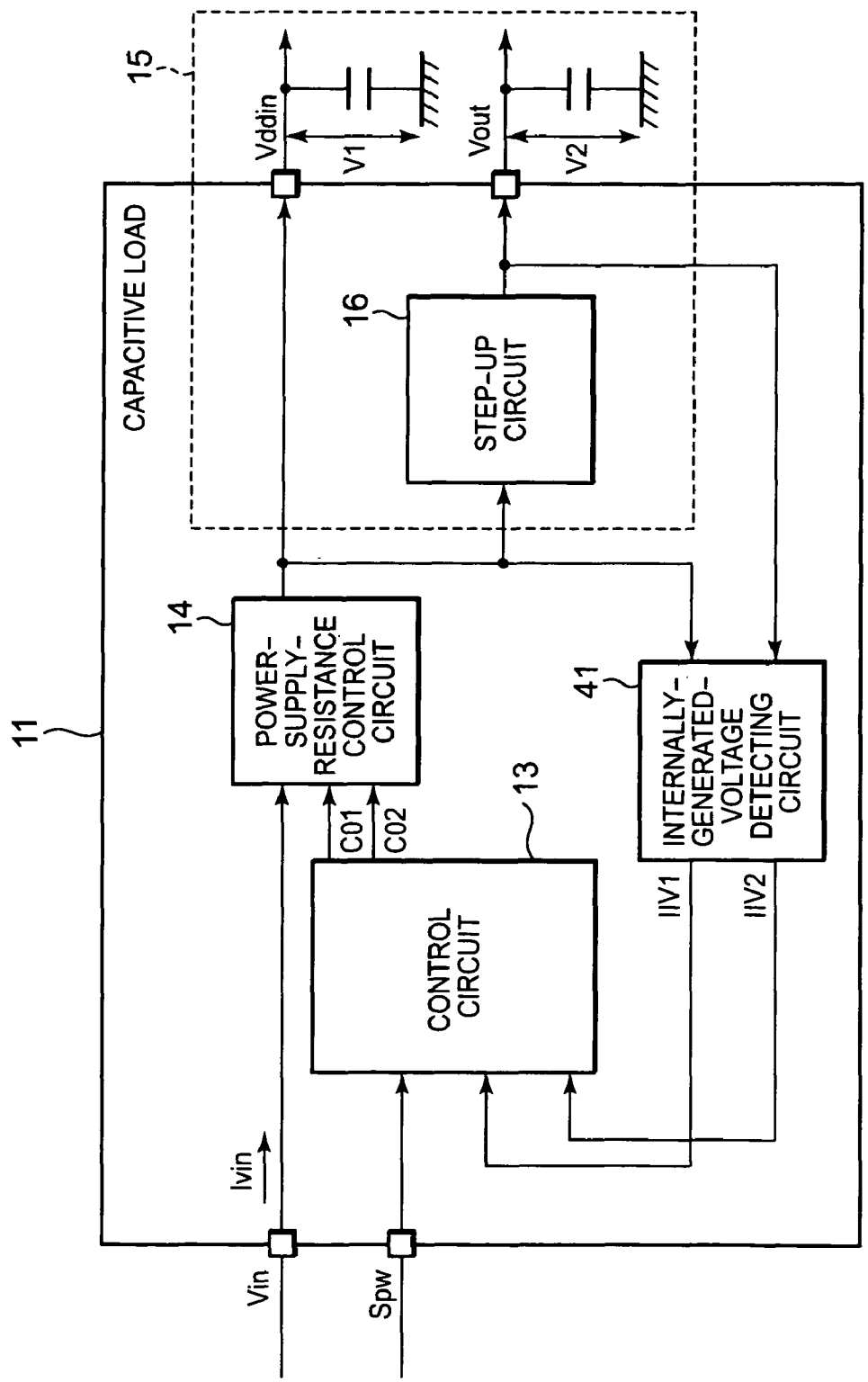
FIG. 27 is a block diagram illustrating a configuration of a power supply circuit 11 of a seventh exemplary embodiment.

FIG. 27 is a block diagram illustrating a configuration of a power supply circuit 11 according to the seventh exemplary embodiment. The basic configuration of the power supply circuit 11 of the seventh exemplary embodiment is the same as that of the power supply circuit 11 of the third exemplary embodiment. The power supply circuit 11 in the seventh exemplary embodiment can reduce the resistance of a power-supply-resistance control circuit 14 in two levels without depending on a signal voltage VAM. An internally-generated-voltage detecting circuit 41 in the seventh exemplary embodiment outputs two detection signals (a first detection signal IIV1 and a second detection signal IIV2).

Figure 28:
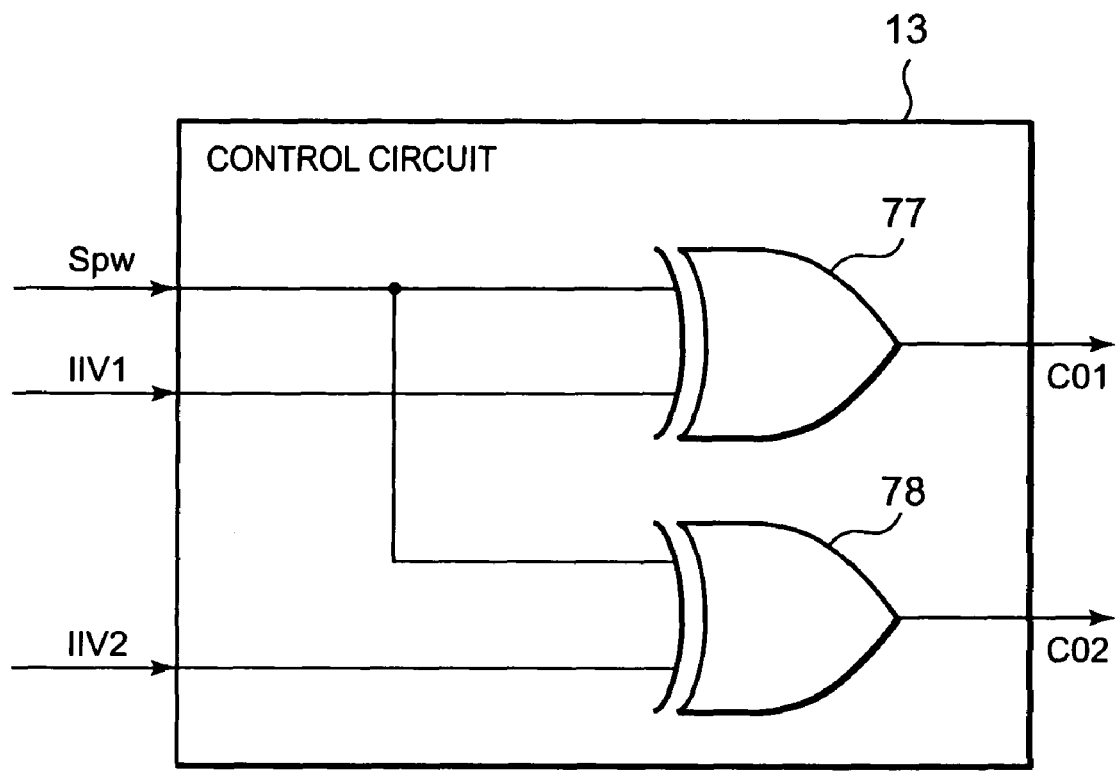
FIG. 28 is a block diagram illustrating a configuration of a control circuit 13 of the seventh exemplary embodiment.

FIG. 28 is a block diagram illustrating a configuration of a control circuit 13 in the seventh exemplary embodiment. The control circuit 13 includes a first EXOR circuit 77 and a second EXOR circuit 78. The first EXOR circuit 77 generates a first control signal CO1 in response to a power-on signal Spw and a first detection signal IIV1. The second EXOR circuit 78 generates a second control signal CO2 in response to the power-on signal Spw and a second detection signal IIV2.

Figure 29:
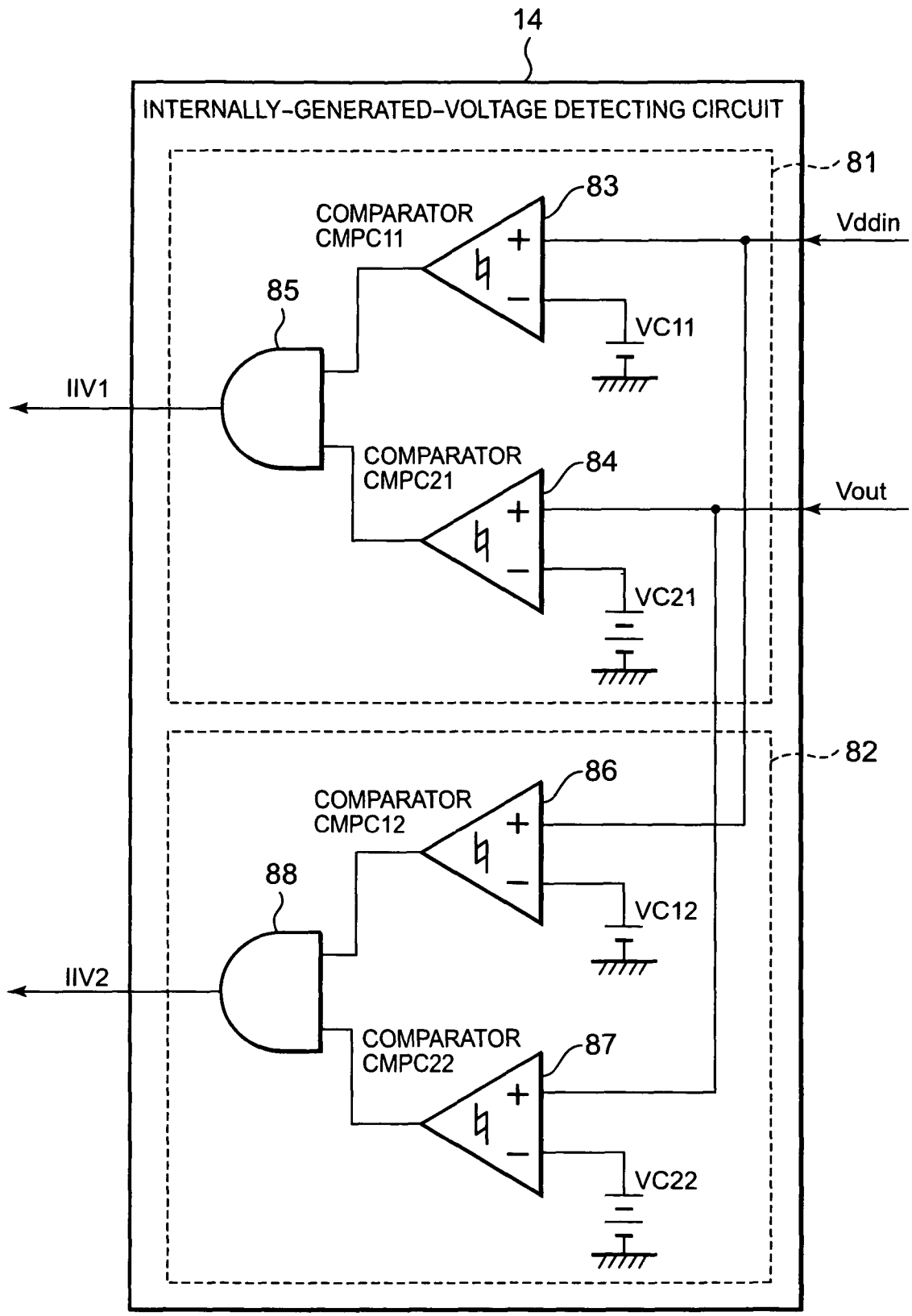
FIG. 29 is a block diagram illustrating a configuration of an internally-generated-voltage detecting circuit 41 of the seventh exemplary embodiment.

FIG. 29 is a block diagram illustrating a configuration of the internally-generated-voltage detecting circuit 41 in the seventh exemplary embodiment. The internally-generated-voltage detecting circuit 41 in the seventh exemplary embodiment includes a first detection signal generating circuit 81 and a second detection signal generating circuit 82. The second detection signal generating circuit 82 includes a first comparator 83, a second comparator 84, and a first AND circuit 85. The second detection signal generating circuit 82 includes a third comparator 86, a fourth comparator 87, and a second AND circuit 88.

The first detection signal generating circuit 81 outputs a first detection signal IIV1 on the basis of the logical AND of the result of comparison between a first internally generated voltage (voltage at a first terminal Vddin) and a reference voltage VC11 and the result of comparison between a second internally generated voltage (voltage at a second terminal Vout) and a reference voltage VC21.

The second detection signal generating circuit 82 generates a second detection signal IIV2 on the basis of the logical AND of the result of comparison between the first internally generated voltage (voltage at the first terminal Vddin) and a reference voltage VC12 and the result of comparison between the second internally generated voltage (voltage at the second terminal Vout) and a reference voltage VC22. With this, the power supply circuit 11 of the seventh exemplary embodiment can provide signal waveforms similar to those in the fifth exemplary embodiment.

In the fourth exemplary embodiment, a circuit that reduces the resistance of the power-supply-resistance control circuit 14 in two levels can also be designed. While 1-level and 2-level power-supply control circuits have been illustrated in the exemplary embodiments, circuits that perform control in three or more levels can be designed as well.

Further, it is noted that Applicant's intent is to encompass equivalents of all claim elements, even if amended later during prosecution.

What is claimed is:

1. A power supply circuit, comprising:
   a control circuit which outputs a control signal when an in-rush current flows; and
   a power-supply-resistance control circuit which supplies a current to a capacitive load;
   wherein the power-supply-resistance control circuit is provided in a current path between a power supply and the capacitive load, increases a resistance of the current path in response to the control signal, and reduces the resistance of the current path in response to a stop page of the control signal,
   wherein the control signal is output or stopped to suppress the in-rush current to a value smaller than or equal to a given value,
   wherein the control circuit outputs the control signal when a value of the in-rush current exceeds a preset threshold, and stops outputting the control signal when the value of the in-rush current no longer exceeds the threshold,
   wherein the control circuit comprises:
   a control signal generating circuit which generates the control signal;
   a hold circuit which holds the control signal output from the control signal generating circuit and continuously outputs the control signal for a given period of time, and
   wherein the hold circuit holds the control signal during a period in which the in-rush signal is exceeding the threshold again due to a reduction in the power-supply resistance by a stop page of output of the control signal.

2. The power supply circuit according to claim 1, further comprising:
   a current measuring circuit which measures a value of the in-rush current, and provides a measurement signal indicating the measured value of the in-rush current to the control circuit, and
   wherein the control signal generating circuit generates the control signal based on a result of comparison between the measurement signal and a reference value.

3. A power supply circuit, comprising:
   a control circuit which outputs a control signal when an in-rush current flows; and
   a power-supply-resistance control circuit which supplies a current to a capacitive load;
   wherein the power-supply-resistance control circuit is provided in a current path between a power supply and the capacitive load, increases a resistance of the current path in response to the control signal, and reduces the resistance of the current path in response to a stop page of the control signal,
   wherein the control signal is output or stopped to suppress the in-rush current to a value smaller than or equal to a given value,
   wherein the control circuit stops an output of the control signal after a given period of time has elapsed after starting the output of the control signal,
   wherein the control circuit receives a turn-on signal for turning on an external power supply circuit and generates the control signal based on the turn-on signal,
   wherein the control circuit comprises:
   a control signal generating circuit;
   a delay circuit which delays the turn-on signal to generate a delayed turn-on signal, and
   wherein the control signal generating circuit includes a first input receiving the turn-on signal and a second input receiving the delayed turn-on signal, and outputs the control signal during a period of time between reception of the turn-on signal and reception of the delayed turn-on signal.

* * * * *